US012358740B2

(12) United States Patent
Maeda et al.

(10) Patent No.: US 12,358,740 B2
(45) Date of Patent: Jul. 15, 2025

(54) SHEET-SHAPED-MEDIUM FEEDER AND SHEET-SHAPED-MEDIUM HANDLING APPARATUS

(71) Applicant: FUJIFILM Business Innovation Corp., Tokyo (JP)

(72) Inventors: Shoichi Maeda, Kanagawa (JP); Masahito Niwa, Kanagawa (JP); Teruki Naganuma, Kanagawa (JP); Yuichi Araki, Kanagawa (JP); Yoshiki Kimura, Kanagawa (JP); Yohei Onoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 209 days.

(21) Appl. No.: 17/224,136

(22) Filed: Apr. 7, 2021

(65) Prior Publication Data

US 2022/0081232 A1 Mar. 17, 2022

(30) Foreign Application Priority Data

Sep. 11, 2020 (JP) ................................ 2020-153046

(51) Int. Cl.

*B65H 1/04* (2006.01)
*B41J 11/00* (2006.01)
*B65H 1/08* (2006.01)

(52) U.S. Cl.

CPC .............. *B65H 1/04* (2013.01); *B41J 11/007* (2013.01); *B65H 1/08* (2013.01)

(58) Field of Classification Search

CPC .... B65H 1/14; B65H 1/20; B65H 2405/11164
See application file for complete search history.

(56) References Cited

U.S. PATENT DOCUMENTS 9,359,157 B2 * 6/2016 Niikura .................... B65H 1/18
11,795,016 B2 * 10/2023 Maeda ..................... B65H 3/14
2018/0354738 A1 * 12/2018 Yazawa .................... B65H 1/14

FOREIGN PATENT DOCUMENTS

JP S60122731 8/1985
JP 2006232533 9/2006
(Continued)

OTHER PUBLICATIONS

"Office Action of Japan Counterpart Application", issued on Jun. 18, 2024, with English translation thereof, pp. 1-7.

*Primary Examiner* — Howard J Sanders
(74) *Attorney, Agent, or Firm* — JCIPRNET

(57) ABSTRACT

A sheet-shaped-medium feeder includes a housing, a mount portion that is disposed to be vertically movable in the housing and that receives sheet-shaped media, a lift that includes line members to vertically raise or lower the mount portion by hanging the mount portion with the line members, and a discharger that transports the sheet-shaped media stacked on the mount portion. The mount portion is changeable to a long mount portion capable of receiving long sheet-shaped media by extending, further upstream in a transportation direction of the sheet-shaped media, an upstream end portion of the mount portion in the transportation direction of the sheet-shaped media. The lift has the line members attached at a portion of the long mount portion corresponding to an unchanged portion of the mount portion, and at a portion of the long mount portion corresponding to an extended portion of the mount portion.

14 Claims, 21 Drawing Sheets

(56) References Cited

FOREIGN PATENT DOCUMENTS

| | | |
|---|---|---|
| JP | 2016000653 | 1/2016 |
| JP | 2016088667 | 5/2016 |
| JP | 6384275 | 9/2018 |

* cited by examiner

SHEET-SHAPED-MEDIUM FEEDER AND SHEET-SHAPED-MEDIUM HANDLING APPARATUS

CROSS-REFERENCE TO RELATED APPLICATIONS

This application is based on and claims priority under 35 USC 119 from Japanese Patent Application No. 2020-153046 filed Sep. 11, 2020.

BACKGROUND

(i) Technical Field

The present disclosure relates to a sheet-shaped-medium feeder and a sheet-shaped-medium handling apparatus.

(ii) Related Art

Existing examples of a feeder capable of feeding a long sheet-shaped medium such as a long sheet with a size longer than an ordinary-sized sheet such as an A4 or A3 sheet include a sheet feeder described in Japanese Patent No. 6384275 (for example, see claim 1, paragraphs 0010 and 0022, and FIGS. 3 to 7).

Japanese Patent No. 6384275 (for example, see claim 1, paragraphs 0010 and 0022, and FIGS. 3 to 7) describes a sheet feeder including a tray bottom board, serving as a mount board that receives sheets, and a long-size option that includes an extension bottom board, serving as an extension board formed to extend the tray bottom board upstream in a sheet transportation direction to allow long sheets to be stacked thereon. The long-size option includes the extension bottom board, a long-size base fixed to the housing, and an open-close covering.

SUMMARY

Aspects of non-limiting embodiments of the present disclosure relate to a sheet-like-article feeder and a sheet-shaped-medium handling apparatus including a sheet-shaped-medium mount portion that is vertically raised or lowered by a lift. When the sheet-shaped-medium mount portion is further extended upstream in a transportation direction of the sheet-shaped media to be formed into a long mount portion capable of receiving long sheet-shaped media, the long mount portion is capable of being raised or lowered while keeping well balanced as a whole, unlike in a case where the lift has no line members attached to the extended portion of the long mount portion.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a sheet-shaped-medium feeder that includes a housing, a mount portion that is disposed to be vertically movable in the housing and that receives sheet-shaped media, a lift that incudes line members to vertically raise or lower the mount portion by hanging the mount portion with the line members, and a discharger that transports the sheet-shaped media stacked on the mount portion. The mount portion is changeable to a long mount portion capable of receiving long sheet-shaped media by extending, further upstream in a transportation direction of the sheet-shaped media, an upstream end portion of the mount portion in the transportation direction of the sheet-shaped media. The lift has the line members attached at a portion of the long mount portion corresponding to an unchanged portion of the mount portion, and at a portion of the long mount portion corresponding to an extended portion of the mount portion.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
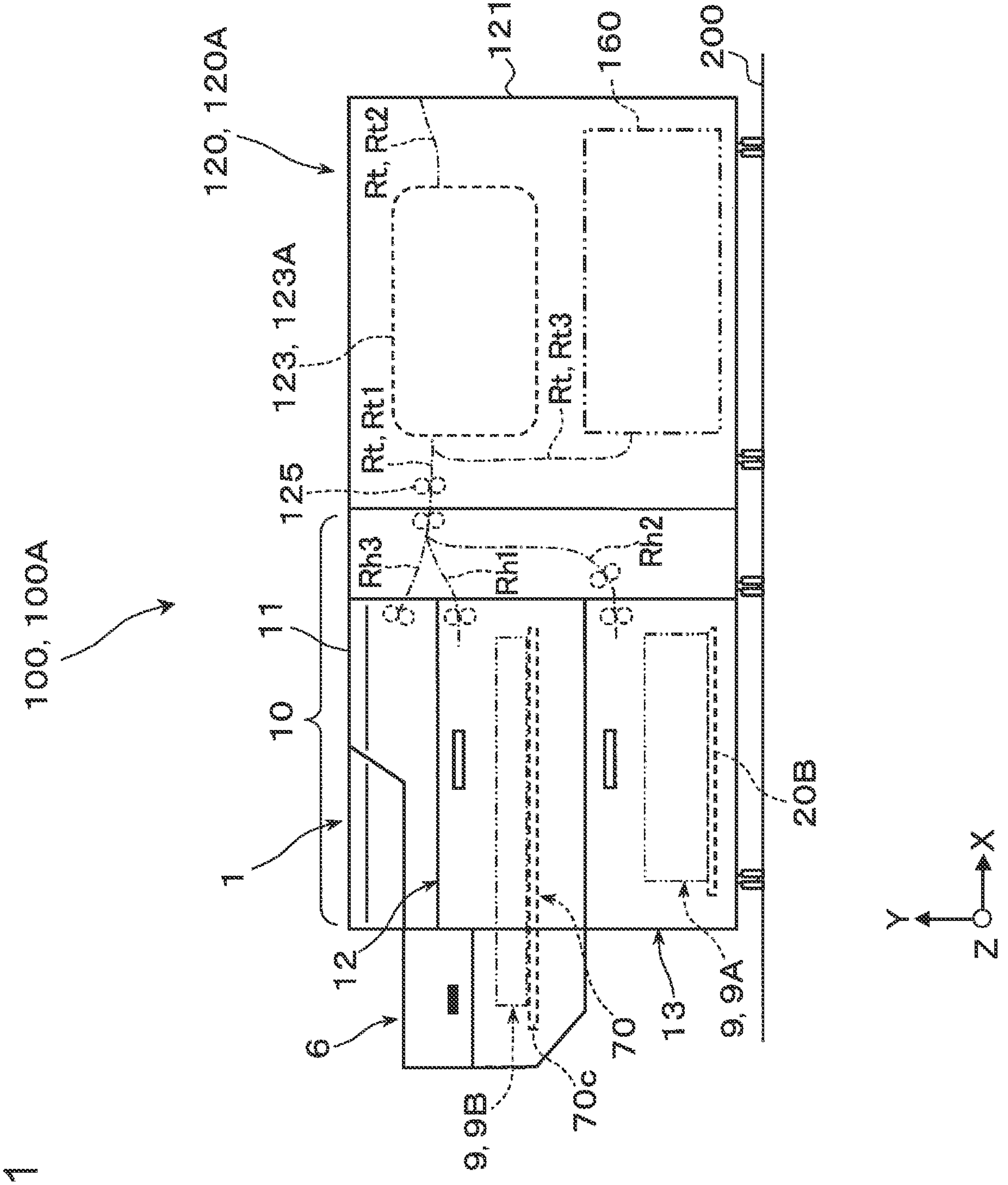
FIG. 1 is a side view of a sheet-shaped-medium handling apparatus according to a first exemplary embodiment.
Figure 2:
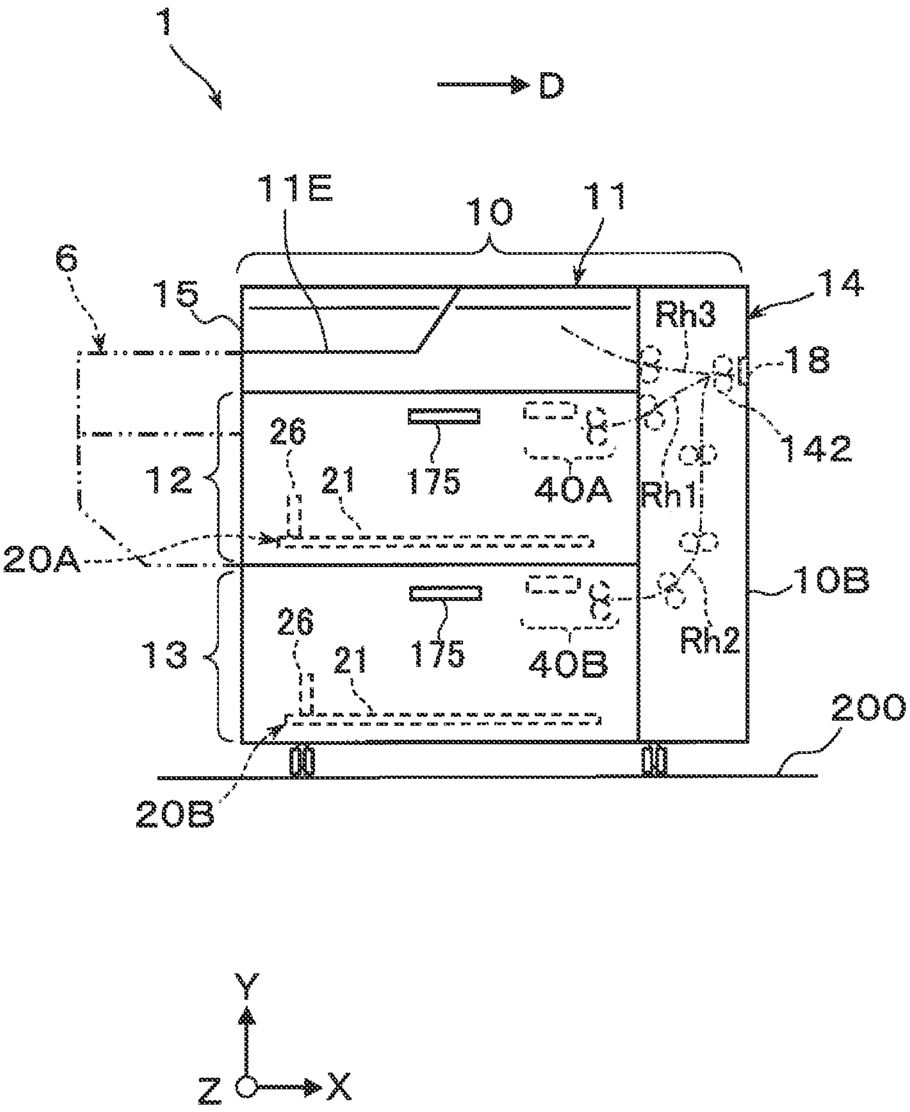
FIG. 2 is a side view of a sheet-shaped-medium feeder according to the first exemplary embodiment.

FIG. 1 illustrates a sheet-shaped-medium handling apparatus 100 according to a first exemplary embodiment of the present disclosure. FIG. 2 illustrates a sheet-shaped-medium feeder 1 according to the first exemplary embodiment.

In the following description, throughout the drawings, the direction indicated with arrow X is referred to as an apparatus width direction, the direction indicated with arrow Y is referred to as an apparatus height direction, and the direction indicated with arrow Z is referred to as an apparatus depth direction perpendicular to the width direction and the height direction. A circle in the drawings at the intersection of the arrow X and the arrow Y denotes the apparatus depth direction (arrow Z) directing downward of the drawing sheet, or perpendicular to the drawing sheet.

Sheet-Shaped-Medium Handling Apparatus

As illustrated in FIG. 1, the sheet-shaped-medium handling apparatus 100 includes the sheet-shaped-medium feeder 1, which transports and feeds sheet-shaped media 9 stacked thereon, and a processing device 120, which performs processing on the sheet-shaped media 9 fed from the feeder 1.

The sheet-shaped media 9 are sheet-like media that are receivable in and transportable by the feeder 1 and transportable and processible by the processing device 120. An image forming system 100A and other portions are installed on an installation surface 200 illustrated in FIG. 1.

The sheet-shaped-medium handling apparatus 100 according to the first exemplary embodiment includes an image forming apparatus 120A that forms images on the sheet-shaped media 9 to serve as the processing device 120. The processing device 120 is connected to and combined with the feeder 1 to form the image forming system 100A.

In the first exemplary embodiment, examples used as the sheet-shaped media 9 include recording media that allow images to be formed thereon, such as sheets, coated paper, films, foil, and sheet-like cloth cut into predetermined sizes.

As illustrated in FIG. 1, the image forming apparatus 120A, serving as an example of the processing device 120, includes an image forming unit 123A and a transport path Rt inside a housing 121 with a predetermined profile. The image forming unit 123A forms images on the sheet-shaped media 9 and serves as an example of a processing unit 123. The transport path Rt allows the sheet-shaped media 9 to be transported along itself inside the housing 121.

The image forming unit 123A has, for example, an image forming system such as an electrophotographic system or an inkjet recording system. However, the image forming system, layout, the number of units, and other details are not limited to particular ones. An introduction transport path Rt1 indicated with a dot-and-dash line in FIG. 1 allows the sheet-shaped media 9 fed from the feeder 1 to be transported along itself and introduced into the image forming unit 123A. The introduction transport path Rt1 includes transport rollers 125, and a transport guide. A discharge transport path Rt2 indicated with a dot-and-dash line allows the sheet-shaped media 9 that have passed the image forming unit 123A to be transported along itself and discharged to a receiving portion or a post-processing unit, not illustrated. The discharge transport path Rt2 includes transport rollers and a transport guide, not illustrated.

In the image forming system 100A, when the sheet-shaped media 9 are fed from the feeder 1 to the image forming apparatus 120A, which is an example of the processing device 120, the image forming apparatus 120A forms images on the fed sheet-shaped media 9. Forming images is an example of processing performed on the sheet-shaped media 9.

As indicated with a chain double-dashed line in FIG. 1, the image forming apparatus 120A may include, inside the housing 121, a sheet-shaped-medium internal feeding unit 160 that accommodates the sheet-shaped media 9 and feeds the sheet-shaped media 9 to the image forming unit 123A. When including the internal feeding unit 160, the image forming apparatus 120A includes a second introduction transport path Rt3 disposed to connect the internal feeding unit 160 and the image forming unit 123A. The image forming at 120A including the internal feeding unit 160 is also usable by being combined with the sheet-shaped-medium feeder 1 serving as an external feeding unit.

Sheet-Shaped-Medium Feeder

As illustrated in FIGS. 1 and 2, the sheet-shaped-medium feeder 1 includes a housing 10 that is a body accommodating and feeding the sheet-shaped media 9.

The feeder 1 allows an additional device 6 to be retrofitted thereto on a side portion 10S of the housing 10. The additional device 6 allows long sheet-shaped media 9B to be stacked thereon to accommodate the long sheet-shaped media 9B.

Here, the long sheet-shaped media 9B are media longer than normal sheet-shaped media 9A with a normal length stackable and receivable in the housing 10 (length in the transportation direction D or feed length, described below). The normal length here is a length handleable inside the housing 10 (specifically, stacked on a mount portion 20A, described below), which is a length of, for example, equal to or smaller than 488 mm.

Body of Feeder

The housing 10 includes a support frame forming a predetermined skeleton structure, and an exterior panel forming the appearance. As illustrated in the drawings such as FIGS. 1 to 4, the housing 10 roughly includes an upper portion 11, feed units 12 and 13 located below the upper portion 11 and vertically stacked one on the other (upper and lower units), and a discharge portion 14 disposed at an end of the upper portion 11 and the feed units 12 and 13 on one side.

The upper portion 11 in the housing 10 includes an open-close member 15 at a portion of the upper surface away from the side where the discharge portion 14 is disposed. The open-close member 15 opens or closes a mount space S1 in the feed unit 12 on the upper side.

Figure 3:
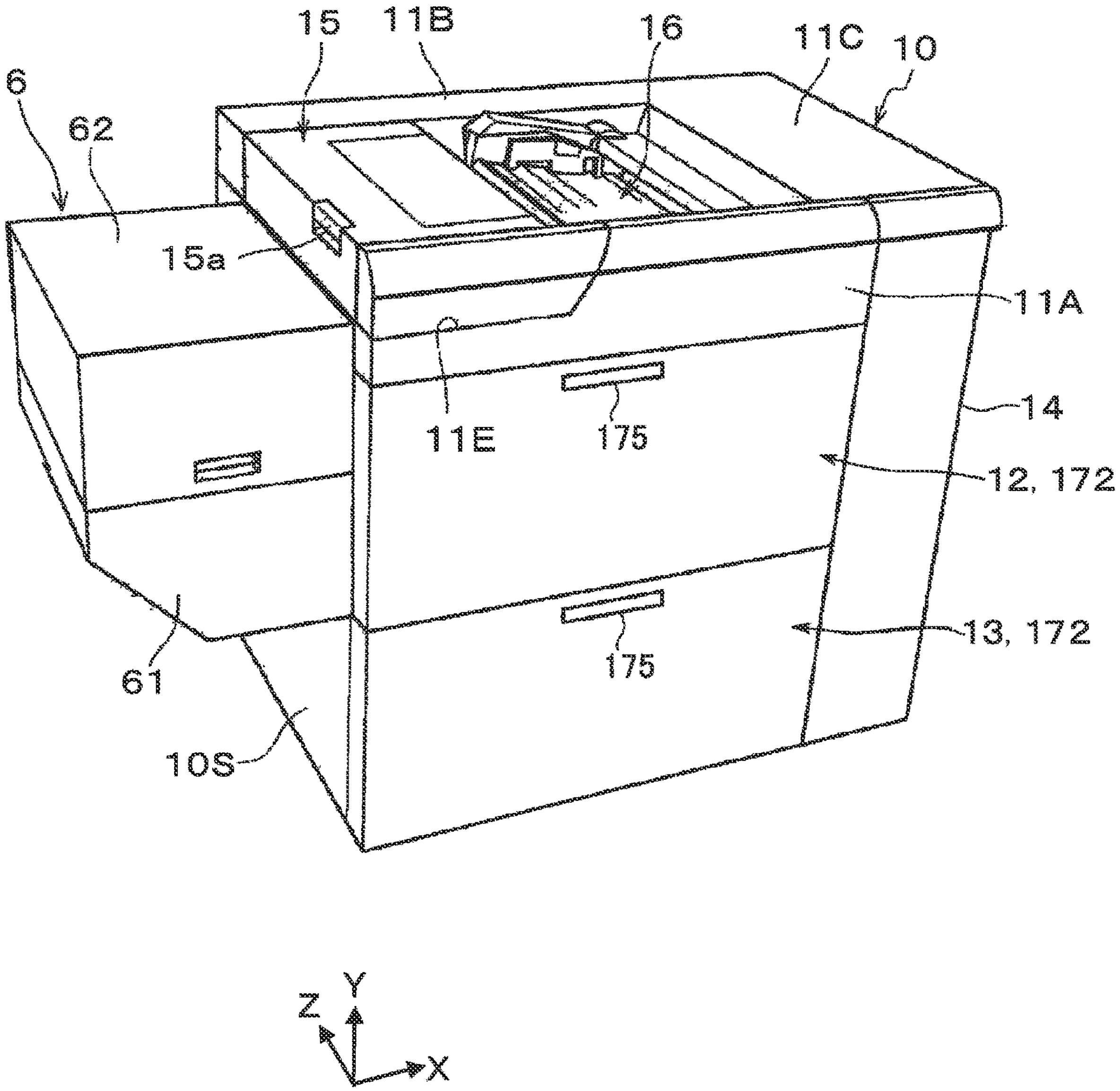
FIG. 3 is a perspective view of the feeder illustrated in FIG. 2 to which an additional device is retrofitted.

The open-close member 15 vertically swings open or closed on a hinge disposed at the end closer to the side where the discharge portion 14 is disposed. The open-close member 15 includes a handle 15*a* at the end opposite to the end closer to the side where the discharge portion 14 is disposed. The handle 15*a* unlocks the open-close member 15 in the closed state (FIG. 3). Thus, when the open-close member 15 is raised upward with the handle 15*a* being a latch mechanism not illustrated is unlocked and the open-close member

Figure 4:
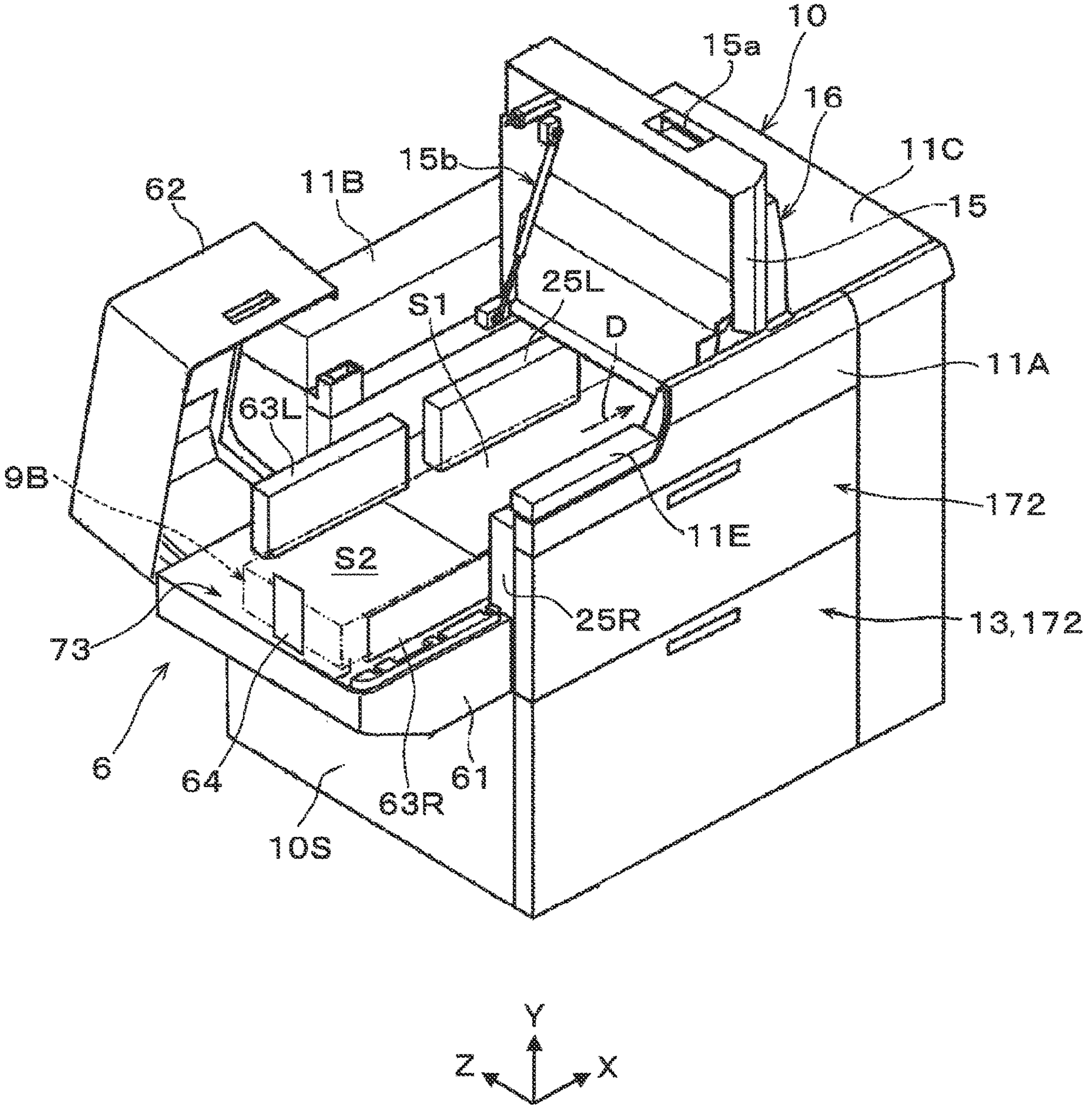
FIG. 4 is a perspective view of an open-close portion and an open-close member of the feeder illustrated in FIG. 3 in an open state.

15 is opened (FIG. 4). A damper 15*b* illustrated in FIG. 4 supports the operation of opening the open-close member 15 and keeps the open-close member 15 opened.

As illustrated in FIG. 3 and other drawings, the open-close member 15 is surrounded by a front wall 11A, a rear wall 11B, and an upper surface portion 11C, forming the upper portion 11. The upper surface portion 11C is disposed between the front wall 11A and the rear wall 11B. A portion of the front wall 11A that is to overlap the closed open-close member 15 forms a cut portion 11E cut downward to further expose the mount space S1 to the outside. The open-close member 15 also has a manual feed unit 16, which receives and feeds the normal sheet-shaped media 9A for manual feeding.

As illustrated in FIGS. 2, 5, 7, and 8 and other drawings, the feed unit 12 on the upper side and the feed unit 13 on the lower side in the housing 10 include containers 17A and 17B, such as trays, mount portions 20A and 20B that receive the normal sheet-shaped media 9A (FIG. 1), a lift 30 that vertically raises and lowers the mount portions 20A and 20B inside the containers 17A and 17B, and dischargers 40A and 40B that discharge the normal sheet-shaped media 9A respectively stacked on the mount portions 20A and 20B toward the discharge portion 14 in the direction of arrow D (in the transportation direction D).

The containers 17A and 17B are attached to be drawable to the near side (upstream side in the apparatus depth direction Z) of the housing 10. The containers 17A and 17B each include a body 170 (FIG. 10), front walls 172, a leading-end wall 173, and a moving device, not illustrated. The body 170 has a rectangular open-top box shape with a side portion open. The front walls 172 are disposed on the near side surface of the body 170. The leading-end wall 173 vertically guides downstream ends of the mount portions 20A and 20B in the transportation direction D, to align the leading ends of the normal sheet-shaped media 9A stacked on the mount portions 20A and 20B for positioning. The leading ends are disposed downstream in the transportation direction D. The moving device includes slide rails and a latch mechanism disposed between the left and right side portions of the body 170 in the pull-out direction and the inner wall of the housing 10.

Figure 10:
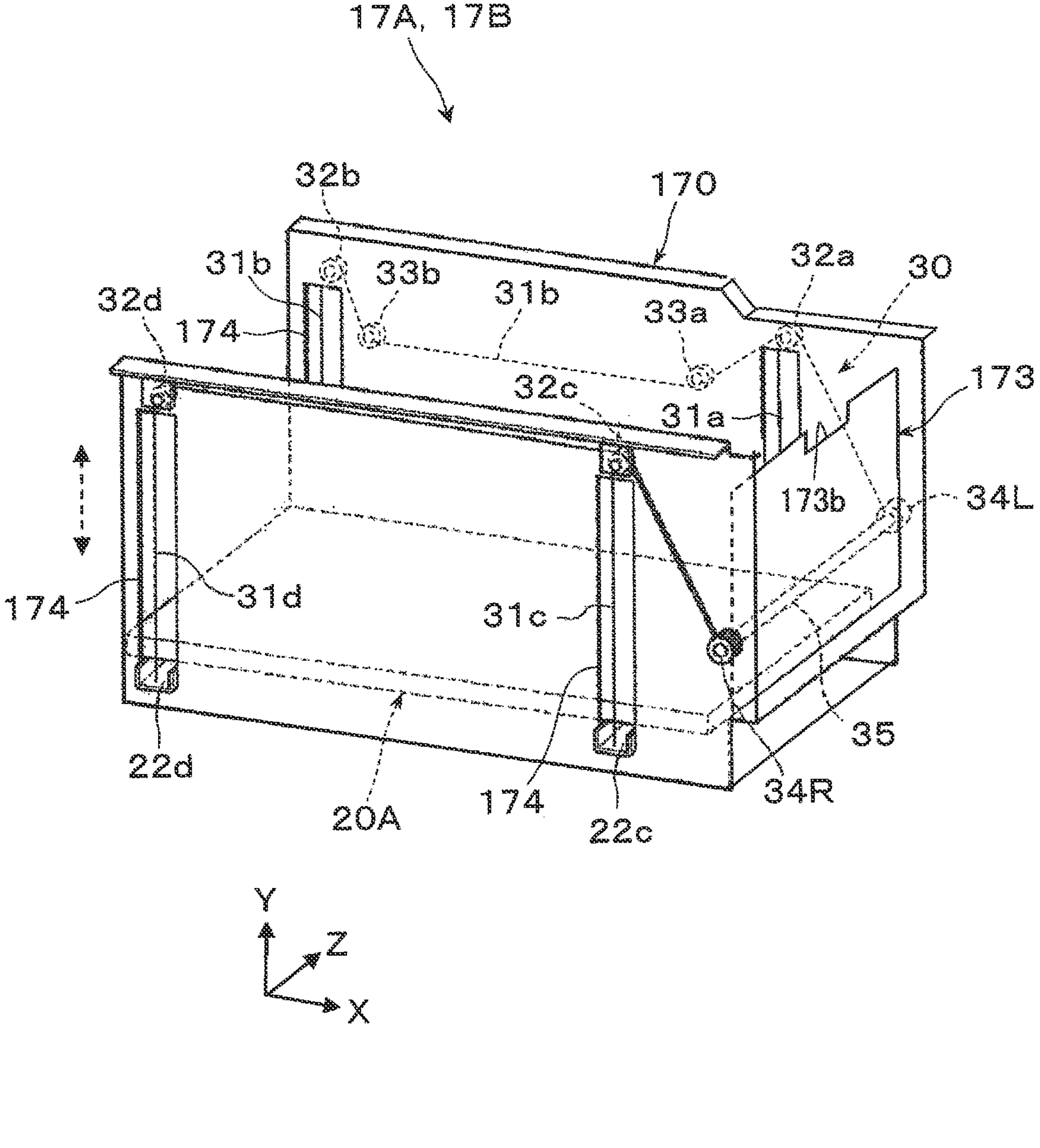
FIG. 10 is a perspective view of a lift and an unchanged mount portion in the feeder illustrated in FIG. 3.

As illustrated in FIG. 10, the leading-end wall 173 has a cut recess 173*b* at the middle at the upper end of the leading-end wall 173. The recess 173*b* enables, for example, checking of existence of the normal sheet-shaped media 9A stacked on the mount portion 20A or 20B.

The containers 17A and 17B each include a pull opening 175 in an upper portion of the corresponding front wall 172, and includes a handle in the pull opening 175. The handle unlocks the containers 17A and 17B stored in the housing 10. The handle is not illustrated. The containers 17A and 17B are thus each drawn out of the housing 10 by being pulled to the near side of the housing 10 while the pull opening 175 and the handle are gripped, and allow the normal sheet-shaped media 9A to be stacked on the mount portions 20A and 20B.

When the additional device 6 is attached to the feeder 1, the pull opening 175 on the front wall 172 of the feed unit 12 on the upper side is blocked to disable the container 17A from being drawn out.

The mount portions 20A and 20B are plate members having a mount surface 21 that receives the normal sheet-shaped media 9A on the upper portion. The mount portions 20A and 20B are disposed to be vertically movable in the containers 17A and 17B.

Figure 9:
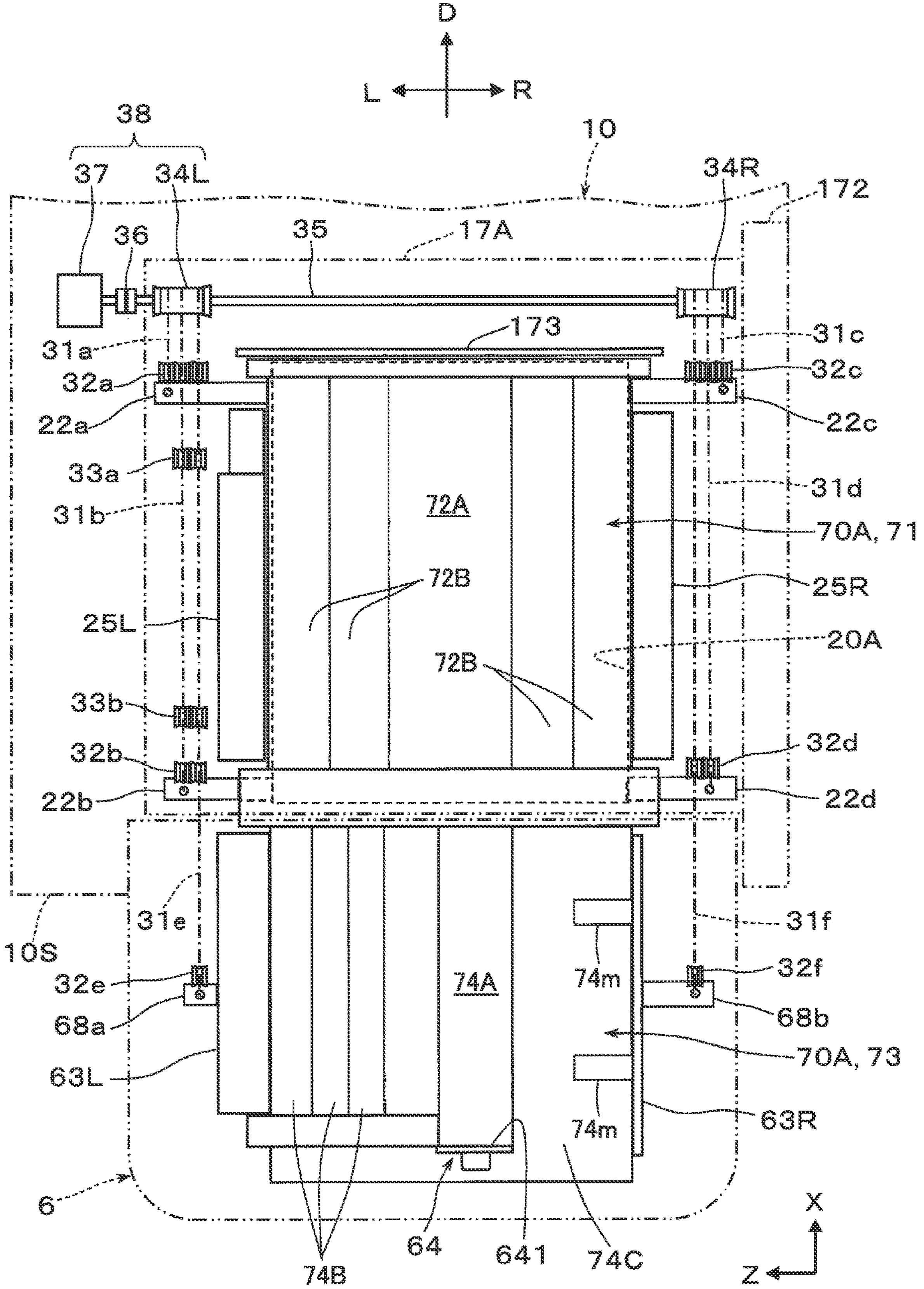
FIG. 9 is a schematic plan view of the lift and the long mount portion in the feeder illustrated in FIG. 3.
Figure 11A:
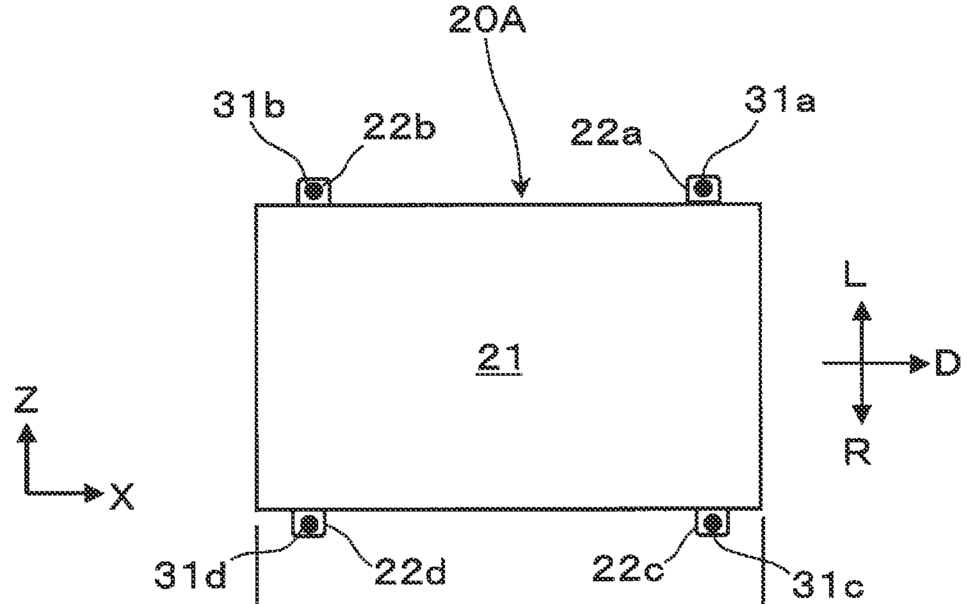
FIG. 11A is a schematic plan view of the unchanged mount portion.

The mount portion 20A among the mount portions 20A and 20B is described as an example. As illustrated in FIGS. 9, 10, and 11A and other drawings, the mount portion 20A includes four hanging portions 22*a*, 22*b*, 22*c*, and 22*d* protruding outward at the left and right edges. The hanging portions 22*a*, 22*b*, 22*c*, and 22*d* are disposed at four positions, that is, two positions in the transportation direction D at each of left and right edges in the left and right directions L and R, where the left and right directions L and R cross the transportation direction D in which the normal sheet-shaped media 9A on the mount portion 20A are discharged by the discharger 40A.

In the first exemplary embodiment, the right direction R is on the near side (front side) of the apparatus, and the left direction on the far side (rear side) of the apparatus.

Figure 7:
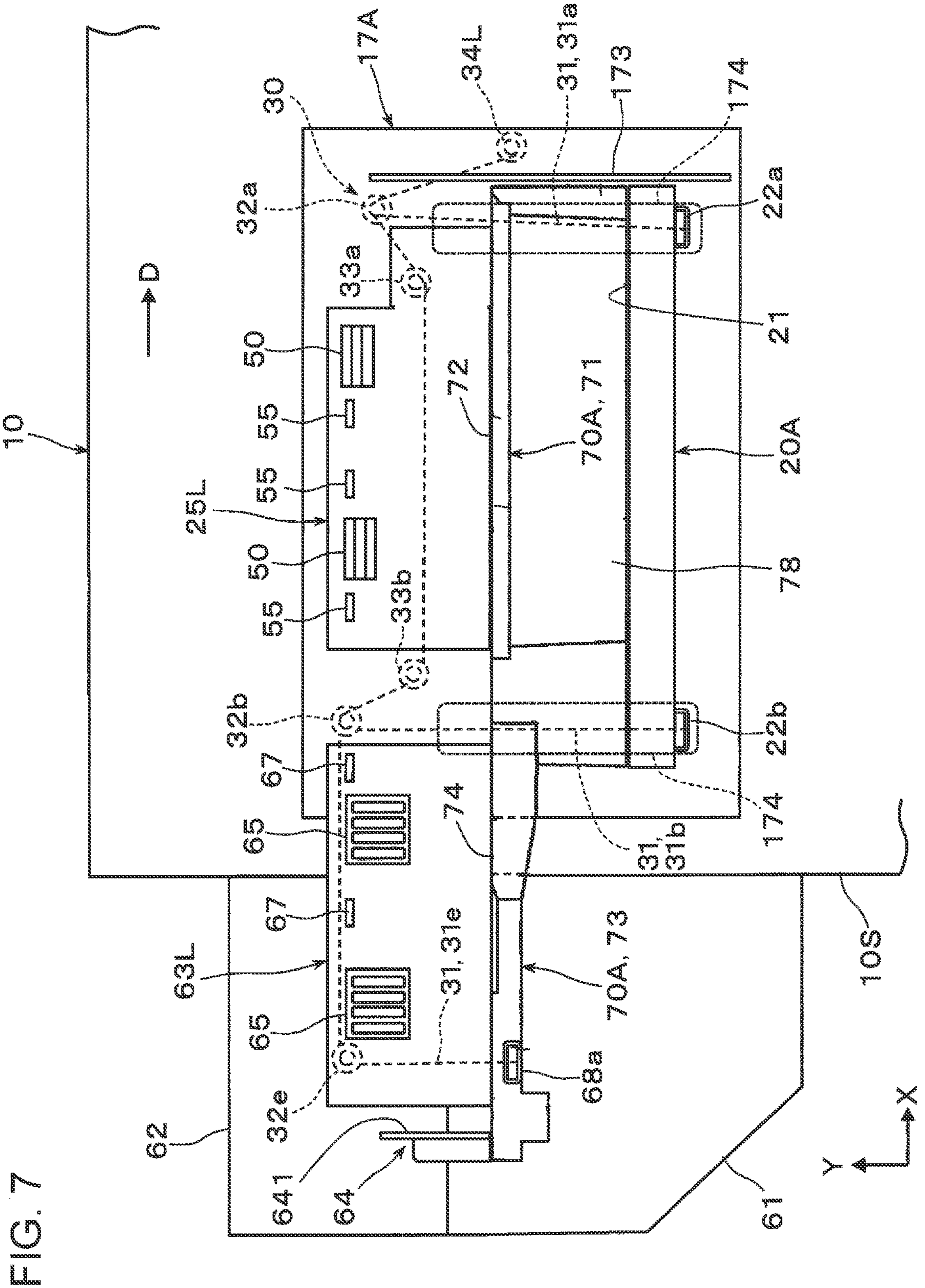
FIG. 7 is a side view of a portion of the feeder illustrated in FIG. 5, including a lift inside the feeder.
Figure 8:
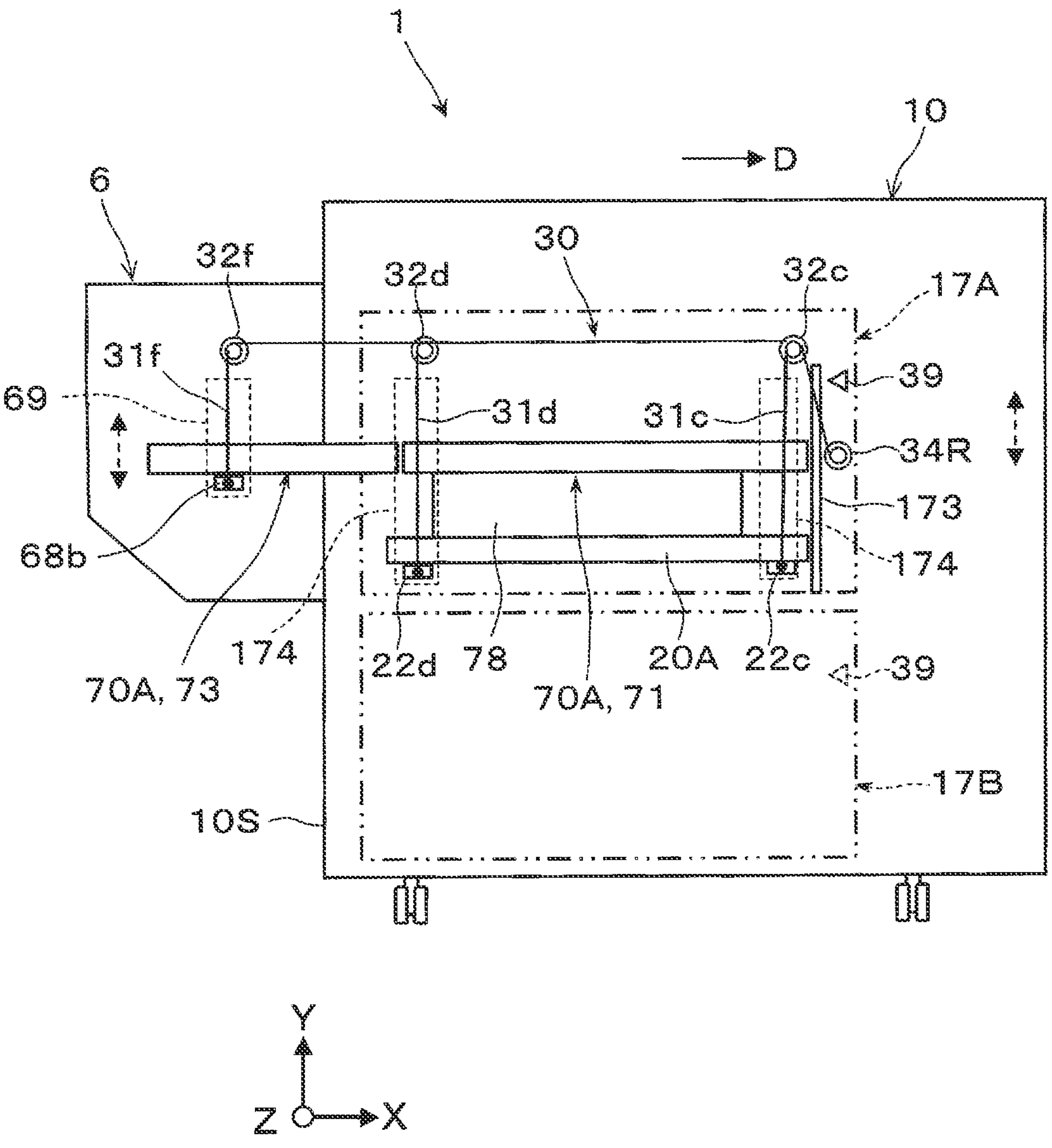
FIG. 8 is a side view roughly including a lift and the long mount portion in the feeder illustrated in FIG. 3.

As illustrated in FIGS. 7, 8, and 10 and other drawings, the mount portion 20A is attached while having the hanging portions 22*a*, 22*b*, 22*c*, and 22*d* fitted, from the inner side of the container 17A, into four guide holes 174 in the near and far side walls of the body 170 of the container 17A. The guide holes 174 are, for example, rectangular openings linearly extending through by a predetermined length in the vertical direction (in the apparatus height direction Y) indicated with a broken double-pointed arrow (FIG. 10).

Thus, the mount portion 20A is vertically movable in the body 170 of the container 17A while having the hanging portions 22*a*, 22*b*, 22*c*, and 22*d* being guided along the guide holes 174. The mount portion 20A is movable by a length of the guide holes 174 in the vertical direction.

The mount portion 203 also has a structure substantially similar to the above structure relating to the vertical movement of the mount portion 20A. Instead of long through-holes, the guide holes 174 may be guide grooves extending linearly.

Figure 6:
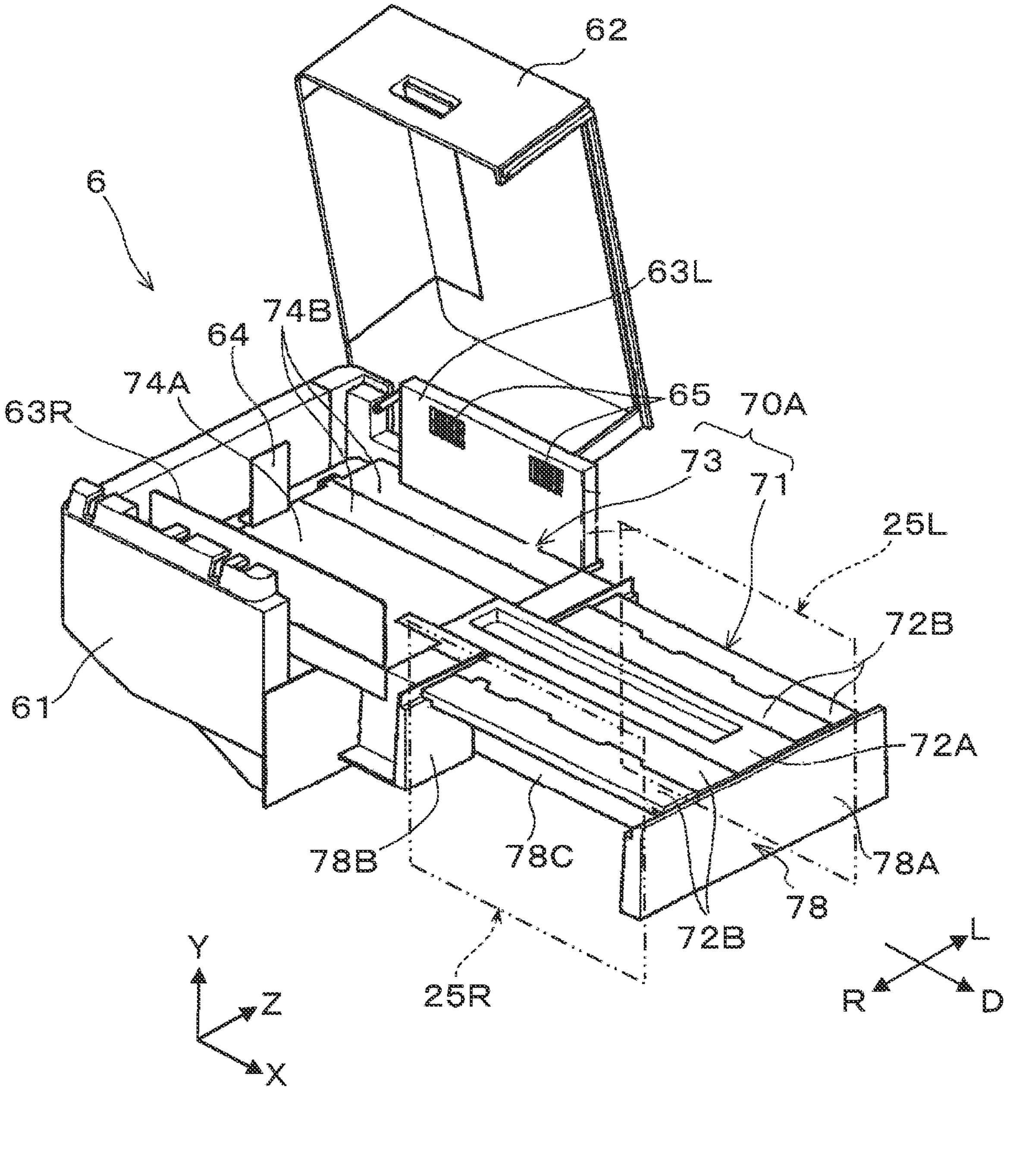
FIG. 6 is a rough perspective view of a long mount portion in an additional device and the feeder illustrated in FIG. 3.

As illustrated in FIGS. 2, 4, and 6 and other drawings, the mount portions 20A and 20B each include left and right side walls 25L and 25R and a rear end wall 26. The left and right side walls 25L and 25R come into contact with left and right edges of the normal sheet-shaped media 9A stacked on the corresponding mount surface 21 to guide the left and right edges in the transportation direction D. The rear end wall 26 aligns the trailing ends of the normal sheet-shaped media 9A, on the upstream side in the transportation direction D, to fix the position of the trailing ends.

The side walls 25L and 25R each include a contact surface 251 (FIG. 5) that comes into contact with the left or right edges of the normal sheet-shaped media 9A. The entirety of the contact surface 251 is movable in the left and right directions L and R over the bottom portion of the body 170 of the container 17A or 17B. Thus, the side walls 25L and 25R are moved to the positions corresponding to the positions of the left and right edges of the sheet-shaped media 9A for adjustment.

The rear end wall 26 has a contact surface that comes into contact with the trailing ends of the normal sheet-shaped media 9A. The entirety of the contact surface is movable with respect to slide grooves, extending the transportation direction D and formed in a fixed surface portion of the mount surface 21. Thus, the rear end wall 26 is moved to the position corresponding to the position of the trailing ends of the sheet-shaped media 9A for adjustment. The rear end wall 26 is retracted and stored in a predetermined portion (such as a raised portion 78, described below) when the additional device 6 is to be attached.

The mount portions 20A and 20B each have the mount surface 21 having the following two surface structures in accordance with the movement structures of the side walls

25L and 25R. Specifically, the mount surface 21 includes a fixed surface portion and multiple slide surface portions. The fixed surface portion is fixed at the middle position in the left and right directions L and R to extend in the transportation direction D. The slide surface portions are disposed on the left and right sides of the fixed surface portion to be slidable in the left and right directions L and R in accordance with the movement of the side walls 25L and 25R. The surface structure of the mount surface 21 in each of the mount portions 20A and 20B is also employed in a mount surface 72 of a dedicated mount portion 71 of a long mount portion 70A, described later (FIG. 6 or 9).

The side walls 25L and 25R each include multiple air outlets 50 in the contact surface 251. The air outlets 50 blow air to the left and right edges of the normal sheet-shaped media 9A stacked on the mount portions 20A and 20B. In the feed units 12 and 13, air blown from the air outlets 50 to cause upper ones of the sheet-shaped media 9A stacked on the mount portions 20A and 20B to float in the air and vertically separate from each other.

The side walls 25L and 25R each include multiple height limiters 55 on the contact surface 251. The height limiters 55 come into contact with the upper surfaces of the left and right edge portions of the normal sheet-shaped media 9A stacked on the mount portions 20A and 20B to limit the upper surfaces to a predetermined height. The feed units 12 and 13 hold from above the left and right edges of the normal sheet-shaped media 9A floated by air blown from the air outlets 50, to keep the normal sheet-shaped media 9A at a predetermined height.

The lift 30 is a device that vertically raises or lowers the mount portions 20A and 20B inside the containers 17A and 17B by hanging the mount portions 20A and 20B with wires 31, serving as an example of line members.

The lift 30 will be described using the mount portion 20A as an example. As illustrated in FIGS. 7 to 10 and other drawings, the lift 30 includes four wires 31*a*, 31*b*, 31*c*, and 31*d* having trailing ends respectively coupled to the hanging portions 22*a*, 22*b*, 22*c*, and 22*d* disposed at four positions of the mount portion 20A.

The lift 30 also includes winding pulleys 32*a*, 32*b*, 32*c*, and 32*d*, a left taking-up pulley 34L, a right taking-up pulley 34R, and auxiliary pulleys 33*a* and 33*b*. The winding pulleys 32*a*, 32*b*, 32*c*, and 32*d* are rotatably attached to portions in the container 17A above the upper ends of the guide holes 174 to have the wires 31*a*, 31*b*, 31*c*, and 31*d* wound therearound. The left taking-up pulley 34L takes up the wires 31*a* and 31*b* disposed on the left. The right taking-up pulley 34R takes up the wires 31*c* and 31*d* disposed on the right. The auxiliary pulleys 33*a* and 33*b* allow the wires 31*a* and 31*b* to be wound therearound so that the wires 31*a* and 31*b* are intendedly routed between the winding pulleys 32*a* and 32*b* and the left taking-up pulley 34L.

As illustrated in FIGS. 9 and 10, the lift 30 connects the left taking-up pulley 34L and the right taking-up pulley 34R with a rotation shaft 35, and connects the end portion of the rotation shaft 35 closer to the left taking-up pulley 34L to a driving device 37 (or a driving shaft thereof) via a detachably connectable coupling mechanism 36. The driving device 37 includes components including a motor and a gear mechanism. In the lift 30, the left taking-up pulley 34L, the right taking-up pulley 34R, and the driving device 37 form a winder 38 that takes up and unwinds the wires 31*a*, 31*b*, 31*c*, and 31*d*.

As illustrated in FIGS. 8 and 12, the lift 30 in the feed unit 12 includes a position sensor 39 that detects the uppermost position of the normal sheet shaped media 9A stacked on the mount portion 20A. The position sensor 39 is disposed, for example, to be capable of detecting the uppermost position of the normal sheet shaped media 9A viewable through the cut recess 173*b* in the leading-end wall 173 of the container 17A.

When the driving device 37 in the lift 30 is driven to take up the wires 31*a*, 31*b*, 31*c*, and 31*d*, the mount portions 20A and 20B move upward, but the driving device 37 is controlled to stop driving upon receipt of detection information from the position sensor 39. Thus, upward movement of the mount portion 20A using the lift 30 is stopped when the uppermost position of the normal sheet-shaped media 9A reaches a predetermined height.

The mount portion 20B in the feed unit 13 on the lower side also includes a lift similar to the lift 30 in the mount portion 20A.

The dischargers 40A and 40B each include a suction portion 41, a transport portion 45, and a guide member, not illustrated. The suction portion 41 sucks the uppermost one of the normal sheet-shaped media 9A stacked on the mount portion 20A or 20B to carry the uppermost medium 9A. The transport portion 45 transports the sheet-shaped medium 9A sucked by the suction portion 41. The guide member forms a first transport path Rh1, described below. The dischargers 40A and 40B may have a structure other than the above structure, for example, a structure of discharging the stacked normal sheet-shaped media 9A from a second-top or lower normal sheet-shaped medium 9A.

The dischargers 40A and 40B are disposed separately from the containers 17A and 17B while being fixed to the housing 10. Thus, the dischargers 40A and 40B are fixed in position inside the housing 10 without moving regardless of when the containers 17A and 17B are drawn out of the housing 10.

The suction portion 41 is disposed to oppose the mount surface 21 of the mount portion 20A or 20B at the downstream end portion of the container 17A or 17B in the transportation direction D and at an upper portion inward from the leading-end wall 173. The suction portion 41 is disposed upstream from the transport portion 45 in the transportation direction D to reciprocate in the transportation direction D at predetermined timing. Thus, the suction portion 41 is movable toward and away from the transport portion 45 during discharging. The suction portion 41 is connected to an aspiration suction device disposed at the far side of the housing 10. The suction device is not illustrated.

The transport portion 45 is disposed outward from and downstream from the leading-end wall 173 of the container 17A or 17B in the transportation direction D, and downstream from the suction portion 41 in the transportation direction D. The transport portion 45 includes, for example, a pair of transport rollers and a guide member, not illustrated.

As illustrated in FIGS. 1 and 2, the discharge portion 14 in the housing 10 includes the first transport path Rh1, a second transport path Rh2, and a third transport path Rh3. Along the first transport path Rh1, the normal sheet-shaped media 9A are transported outward by the discharger 40A from the feed unit 12 on the upper side. Along the second transport path Rh2, the normal sheet-shaped media 9A are transported outward by the discharger 40B from the feed unit 13 on the lower side. Along the third transport path Rh3, manually fed sheet-shaped media 9 are transported outward from the manual feed unit 16.

The first transport path Rh1, the second transport path Rh2, and the third transport path Rh3 are discharge transport paths extending up to discharge rollers 142 at a discharge port 18 in a side portion 10B of the housing 10 while merging midway. The first transport path Rh1, the second transport path Rh2, and the third transport path Rh3 each include pairs of transport rollers, drawn with broken lines, and a transport guide member not illustrated.

In the feeder 1 not including the additional device 6, to stack the normal sheet-shaped media 9A on the mount portion 20A of the feed unit 12 on the upper side and the mount portion 20B of the feed unit 13 on the lower side, the container 17A and the container 17B are pulled out to the near side of the housing 10 for the stacking operation.

Here, pulling out the container 17A and the container 17B detaches the coupling mechanism 36. Thus, the rotation shaft 35 and the driving device 37 in the lift 30 are disconnected. Thus, the mount portion 20A and the mount portion 20B are lowered by their own weight to their lowermost positions. The lowermost position of the mount portion 20A is, for example, the position where the hanging portions 22*a*, 22*b*, 22*c*, and 22*d* come into contact with the lowest end portions of the guide holes 174.

After the operation of stacking the normal sheet-shaped media 9A is finished, the container 17A and the container 17B are pushed into the housing 10 to be retracted. Thus, the coupling mechanism 36 is coupled again, so that the rotation shaft 35 and the driving device 37 in the lift 30 are coupled.

Feeding Operation of Normal Sheet-Shaped Medium

The sheet-shaped-medium feeder 1 with no additional device 6 retrofitted thereto feeds the normal sheet-shaped media 9A and other media in the following manner.

Specifically, the feed unit 12 on the upper side in the feeder 1 will be described as an example. Inside the container 17A, the mount portion 20A is moved upward by the lift 30 simultaneously taking up the wires 31*a*, 31*b*, 31*c*, and 31*d* until the upper portion of the normal sheet-shaped media 9A stacked on the mount portion 20A reaches the predetermined height.

Subsequently, at the mount portion 20A, air is discharged from the multiple air outlets 50 in the left and right side walls 25L and 25R, so that upper ones of the normal sheet-shaped media 9A float with air flow and separate from each other. In the container 17A, the leading end portion, in the transportation direction D, of the floating uppermost one of the sheet-shaped media 9A is sucked by receiving a suction force from the suction portion 41 of the discharger 40A.

Subsequently, in the feeder 1, the suction portion 41 of the discharger 40A moves to transport the leading end portion of the sucked one of the sheet-shaped media 9A, disposed downstream in the transportation direction D, to a delivery position where the suction portion 41 passes the leading end portion to the transport portion 45 to deliver the leading end portion to the transport portion 45 (to introduce the leading end portion between a pair of rollers).

Subsequently, the transport portion 45 of the discharger 40A transports the delivered sheet-shaped medium 9A out of the mount portion 20A and the container 17A with a transport force to feed the sheet-shaped medium 9A to the first transport path Rh1. When finishes transporting the sheet-shaped medium 9A to the transport portion 45, the suction portion 41 temporarily stops the suction force and moves to return to the original suction position away from the transport portion 45.

Thus, after the normal sheet-shaped medium 9A is discharged from the feed unit 12 on the upper side through the discharge port 18 via the first transport path Rh1, the normal sheet-shaped medium 9A is fed to the image forming apparatus 120A (the first introduction transport path Rt1 of the image forming apparatus 120A), serving as an example of a destination.

In the feeder 1, in substantially the same manner as in the feeding operation from the feed unit 12 on the upper side, after the normal sheet-shaped media 9A stacked on the mount portion 20B are also discharged from the feed unit 13 on the lower side through the discharge port 18 via the second transport path Rh2, the normal sheet-shaped media 9A are fed to the destination.

Additional Device of Feeder

As illustrated in FIG. 4 and other drawings, the additional device 6 is retrofitted to change the mount portion 20A of the feed unit 12 on the upper side in the housing 10 of the feeder 1 to the long mount portion 70A, capable of receiving the long sheet-shaped media 9B, by further extending an end portion 70*c* to the upstream side from an unchanged position in the transportation direction D.

Figure 5:
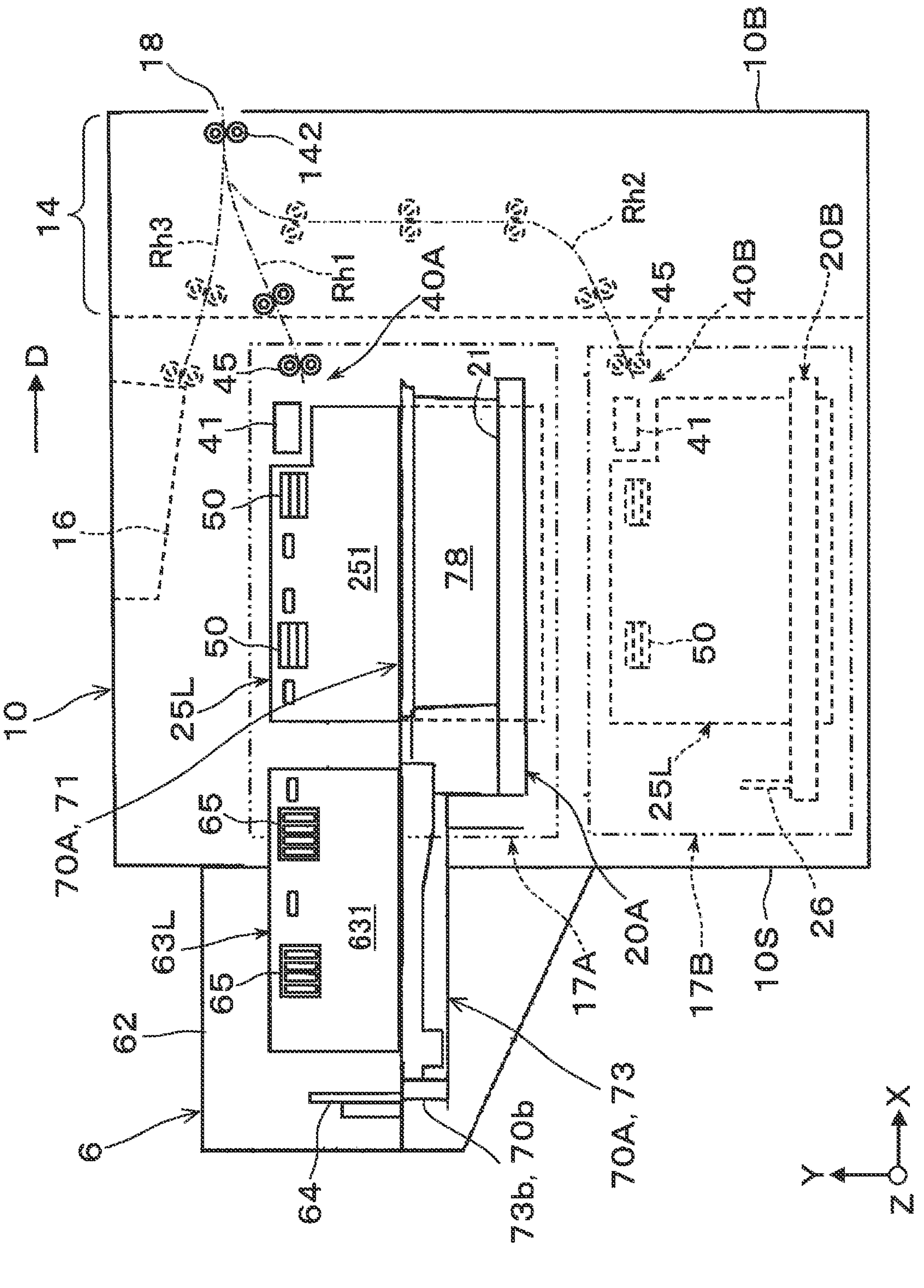
FIG. 5 is a schematic side view of part of the inside of the feeder illustrated in FIG. 3.
Figure 11B:
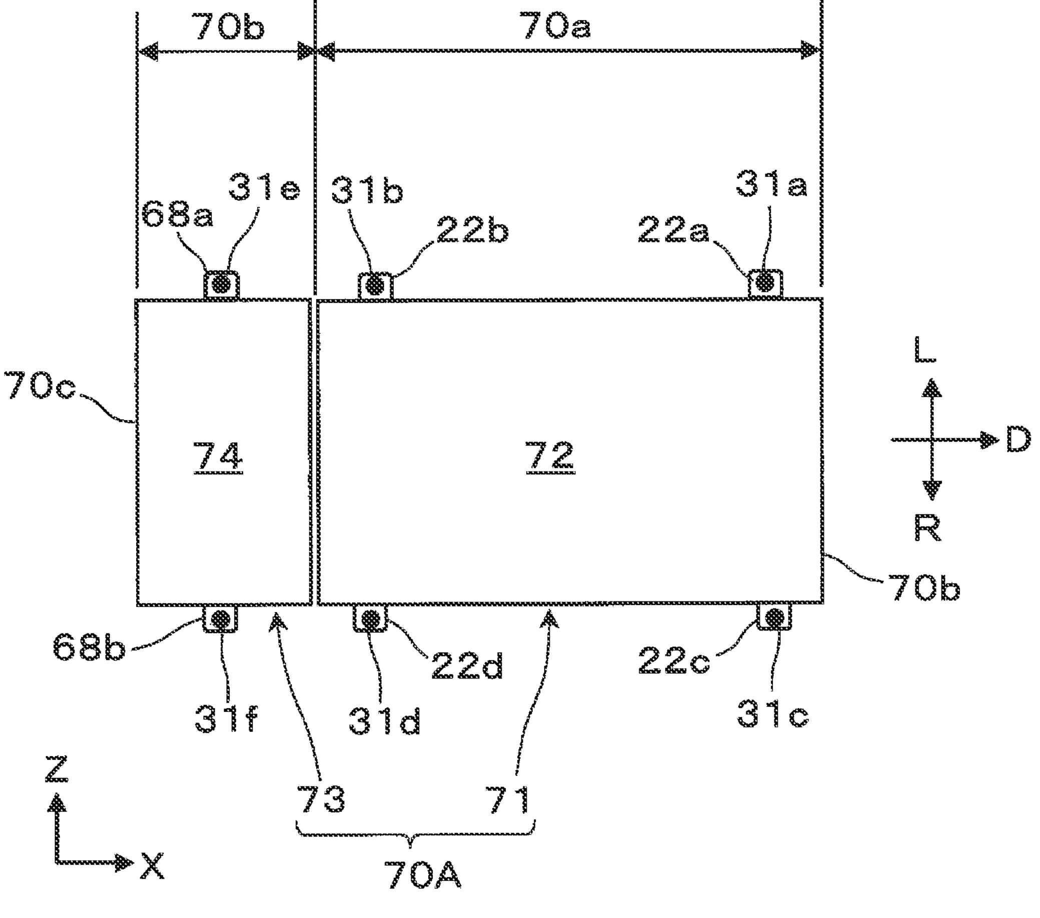
FIG. 11B is a schematic plan view of the long mount portion after change.

As illustrated in FIGS. 5, 7, and 11B and other drawings, in the additional device 6 according to the first exemplary embodiment, at least the end portion 70*c*, upstream in the transportation direction D, of the mount portion 70*b* extended from the unchanged mount portion 70*a* disposed inside the housing 10 is changeable to the long mount portion 70A to serve as a long mount portion 70. The long mount portion 70A protrudes outward from the side portion 10S of the housing 10.

Thus, the additional device 6 is attached to the upper portion of the side portion 10S of the housing 10 of the feeder 1 while protruding outward from the housing 10. The additional device 6 includes a body 61, attached to protrude from the side portion 10S of the housing 10, and an open-close portion 62, disposed above the body 61 to serve as a covering. For example, the additional device 6 is attached after part of an exterior member (panel) at the side portion 10S of the housing 10 is removed.

The body 61 is a portion with a shape having a space for accommodating part (extended part or the mount portion 70*b*) of the long mount portion 70A, and includes a support frame and an exterior member. Part of the support frame is fixed by being screwed on, for example, a support frame disposed on the inner side of the side portion 10S of the housing 10.

As illustrated in FIGS. 4 and 6 and other drawings, the open-close portion 62 is openably attached at the apparatus far side to vertically swing on a hinge, not illustrated, disposed at the far side of the body 61 in the apparatus depth direction Z. When opened, the open-close portion 62 exposes the mount space S2 (FIG. 4) in the mount portion 70*b* (an additional mount portion 73, described later), which is the extended portion of the long mount portion 70A, to allow the long sheet-shaped media 9B to be stacked on the long mount portion 70A.

As illustrated in FIGS. 5 to 9 and 11B, the long mount portion 70A according to the first exemplary embodiment includes a dedicated mount portion 71, disposed inside the housing 10, and the additional mount portion 73, additionally disposed at the upstream end of the dedicated mount portion 71 in the transportation direction D. Here, the dedicated mount portion 71 corresponds to the unchanged mount portion 70*a*, and an additional mount portion 73 corresponds to the extended mount portion 70*b*.

The dedicated mount portion 71 in the long mount portion 70A is formed as a mount portion disposed above a raised portion 78, provided for raising the mount surface 21 when the mount portion 20A in the feed unit 12 on the upper side is in the lowermost position.

Here, the raised portion 78 is used to reduce the quantity (mass) of the long sheet-shaped media 9B stacked on the long mount portion 70A to further reduce the load on the lift 30 than in the case where no raised portion 78 is disposed (for example, a case where the long mount portion 70A is coupled to the additional mount portion 73 while having the mount surface of the additional mount portion 73 located at the same level as the mount portion 20A).

The raised portion 78 is a construction disposed on the mount surface 21 of the mount portion 20A. On the upper portion of the raised portion 78, the dedicated mount portion 71 having the mount surface 72 is disposed. The mount surface 72 receives the downstream side portion of the long sheet-shaped media 9B in the transportation direction D.

Except for the dedicated mount portion 71, the raised portion 78 is formed as a construction including, for example, a downstream end wall 78A, an upstream end wall 78B, and an intermediate portion 78C. The downstream end wall 78A extends in the apparatus depth direction Z on the downstream side in the transportation direction D. The upstream end wall 78B extends in the apparatus depth direction Z on the upstream side in the transportation direction D. The intermediate portion 78C extends in the transportation direction D between the downstream end wall 78A and the upstream end wall 78B to support the dedicated mount portion 71.

The additional mount portion 73 has an upstream end portion 73*b* protruding outward from the side portion 10S of the housing 10. Thus, the upstream end portion 73*b* extends from the inside (upstream end portion of the dedicated mount portion 71) of the housing 10 into the body 61 of the additional device 6. The additional mount portion 73 has a mount surface 74 that receives the upstream portions (trailing ends) of the long sheet-shaped media 9B in the transportation direction D.

As illustrated in FIGS. 5, 7, and 9 and other drawings, the dedicated mount portion 71 in the long mount portion 70A is disposed while having the left and right side walls 25L and 25R in the feed unit 12 on the upper side protruding upward at the left and right edges in the left and right directions L and R crossing the transportation direction D. Here, the air outlets 50 in and the height limiters 55 on the left and right side walls 25L and 25R are located above the mount surface 72 of the dedicated mount portion 71 (FIGS. 5 and 7).

As illustrated in FIGS. 6 and 9, to correspond to the left and right side walls 25L and 25R having the above structure movable in the left and right directions L and R, the dedicated mount portion 71 has the mount surface 72 having two types (fixed and sliding) of surface structures, as in the case of the mount surface 21 of the mount portion 20A.

Specifically, the mount surface 72 includes a fixed surface portion 72A, fixed at the middle position in the left and right directions L and R to extend in the transportation direction D, and multiple slide surface portions 72B, disposed to slide in the left and right directions L and R in response to movement of the left and right side walls 25L and 25R on both left and right sides of the fixed surface portion 72A.

As illustrated in FIGS. 4 to 7 and 9 and other drawings, the additional mount portion 73 in the long mount portion 70A includes left and right side walls 63L and 63R and a rear end wall 64. The left and right side walls 63L and 63R come into contact with the left and right edges of the long sheet-shaped media 9B stacked on the mount surface 74 at the trailing end portions to guide the left and right edges in the transportation direction D. The rear end wall 64 aligns the trailing ends of the long sheet-shaped media 9B on the upstream side in the transportation direction D for positioning.

The side walls 63L and 63R each include a contact surface 631 (FIG. 5) that comes into contact with the left or right edges of the long sheet-shaped media 9B. The entireties of the side walls 63L and 63R are movable in the left and right directions L and R over the bottom portion of the body 61 of the additional device 6. Thus, the side walls 63L and 63R are moved to the positions corresponding to the positions of the left and right edges of the long sheet-shaped media 9B for adjustment.

To correspond to the left and right side walls 63L and 63R having a structure movable in the left and right directions L and R, as illustrated in FIGS. 6 and 9, the additional mount portion 73 has the mount surface 74 having two types of (fixed and sliding) surface structures as in the case of the mount surface 72 in the dedicated mount portion 71.

Specifically, as illustrated in FIG. 9 and other drawings, the mount surface 74 includes a fixed surface portion 74A, multiple slide surface portions 74B, and a right fixed surface portion 74C. The fixed surface portion 74A is fixed at the middle portion in the left and right directions L and R to extend in the transportation direction D. The multiple slide surface portions 74B side in the left and right directions L and R in response to movement of the left side wall 63L on the left side of the fixed surface portion 74A. The right fixed surface portion 74C has slide grooves 74*m* (FIG. 9) in the upper surface. The slide grooves 74*m* allow the right side wall 63R to slide in the left and right directions L and R.

The rear end wall 64 has a contact surface 641 (FIG. 7) that comes into contact with the trailing ends of the long sheet-shaped media 9B. The entirety of the rear end wall 64 is movably held by, for example, a magnetic force on a sliding surface extending in the transportation direction D on the fixed surface portion 74A of the mount surface 74. Thus, the rear end wall 64 is moved to the position corresponding to the position of the trailing ends of the long sheet-shaped media 9B for adjustment.

As illustrated in FIG. 5 or 7, as in the case of the air outlets 50 in the left side wall 25L, multiple air outlets 65 are formed in the contact surface 631 of the left side wall 63L. The air outlets 65 blow air to the left edges of the long sheet-shaped media 9B stacked on the additional mount portion 73 at the trailing end portions. As illustrated in FIGS. 5 and 7, as in the case of the height limiters 55 on the left side wall 25L, the left side wall 63L has a contact surface 631 on which multiple height limiters 67 are disposed. The multiple height limiters 67 come into contact with the upper surface portions of the left and right edges of the long sheet-shaped media 9B stacked on the additional mount portion 73 at the trailing end portions to limit the upper surface portions to a predetermined height.

The right side wall 63R is formed from a plate member extending in the transportation direction D. The right side wall 63R has neither the air outlets 65 nor the height limiters 67.

To feed the long sheet-shaped media 9B, the additional device 6 is retrofitted to the side portion 10S of the housing 10. Here, the additional device 6 is an option, and thus may be attached at factory shipment in response to receipt of an order before factory shipment.

In attachment of the additional device 6, the long mount portion 70A and other components are also attached. Here, the dedicated mount portion 71 in the long mount portion 70A is fixed onto the mount surface 21 of the mount portion 20A in the container 17A of the feed unit 12 on the upper side of the housing 10 via the raised portion 78. The long mount portion 70A is assembled while having the upstream end portion of the dedicated mount portion 71 in the transportation direction D being coupled to the additional mount portion 73 with a fastening device not illustrated to be integrated.

Feeder to which Additional Device is Attached

Figure 12A:
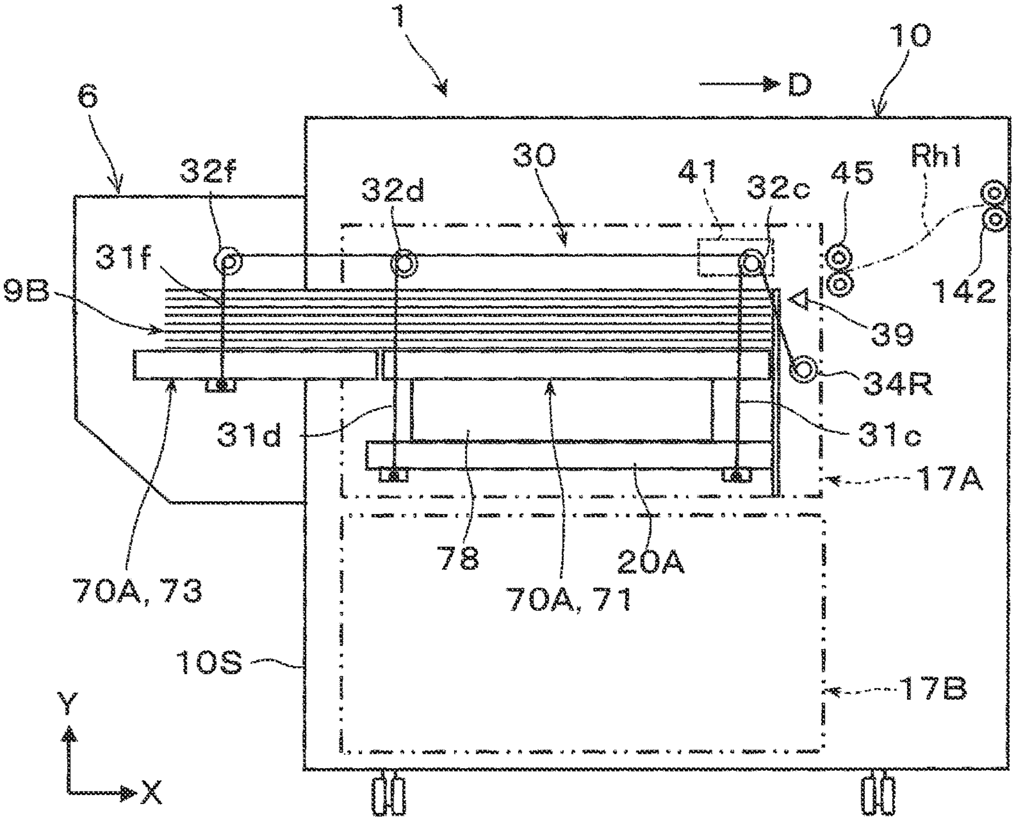
FIG. 12A is a schematic side view illustrating the operation of the feeder illustrated in FIG. 3.
Figure 12B:
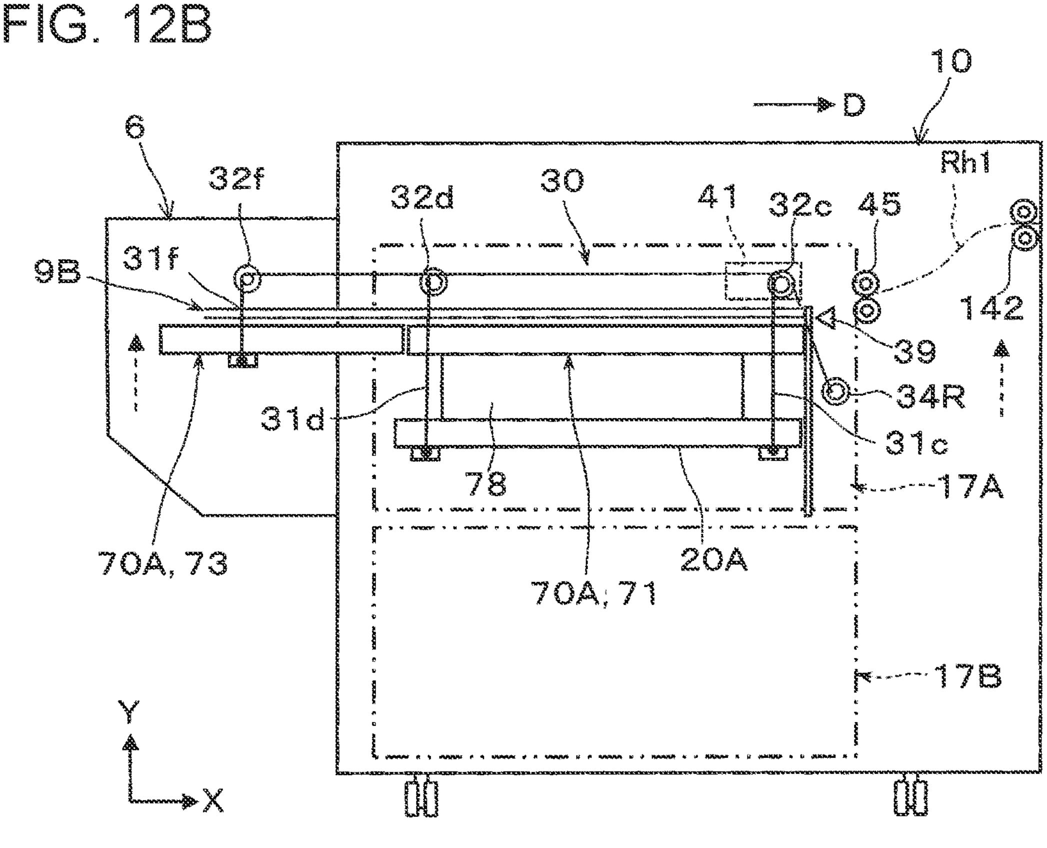
FIG. 12B is a schematic side view illustrating an operation different from the operation of the feeder illustrated in FIG. 12A.

As illustrated in FIGS. 12A and 12B, the sheet-shaped-medium feeder 1 to which the additional device 6 is attached is capable of receiving the long sheet-shaped media 9B on the long mount portion 70A including the dedicated mount portion 71 and the additional mount portion 73.

In the first exemplary embodiment, the long mount portion 70A is formed as, for example, a mount portion capable of receiving the long sheet-shaped media 9B with a length in the transportation direction D (length when discharged) of longer than 486 mm and equal to or shorter than 864 mm.

Also for the feeder 1 to which the additional device 6 is attached, to perform the operation of feeding the long sheet-shaped media 9B, the long mount portion 70A is raised by the lift 30 as in the case of feeding the normal sheet-shaped media 9A.

Figure 21:
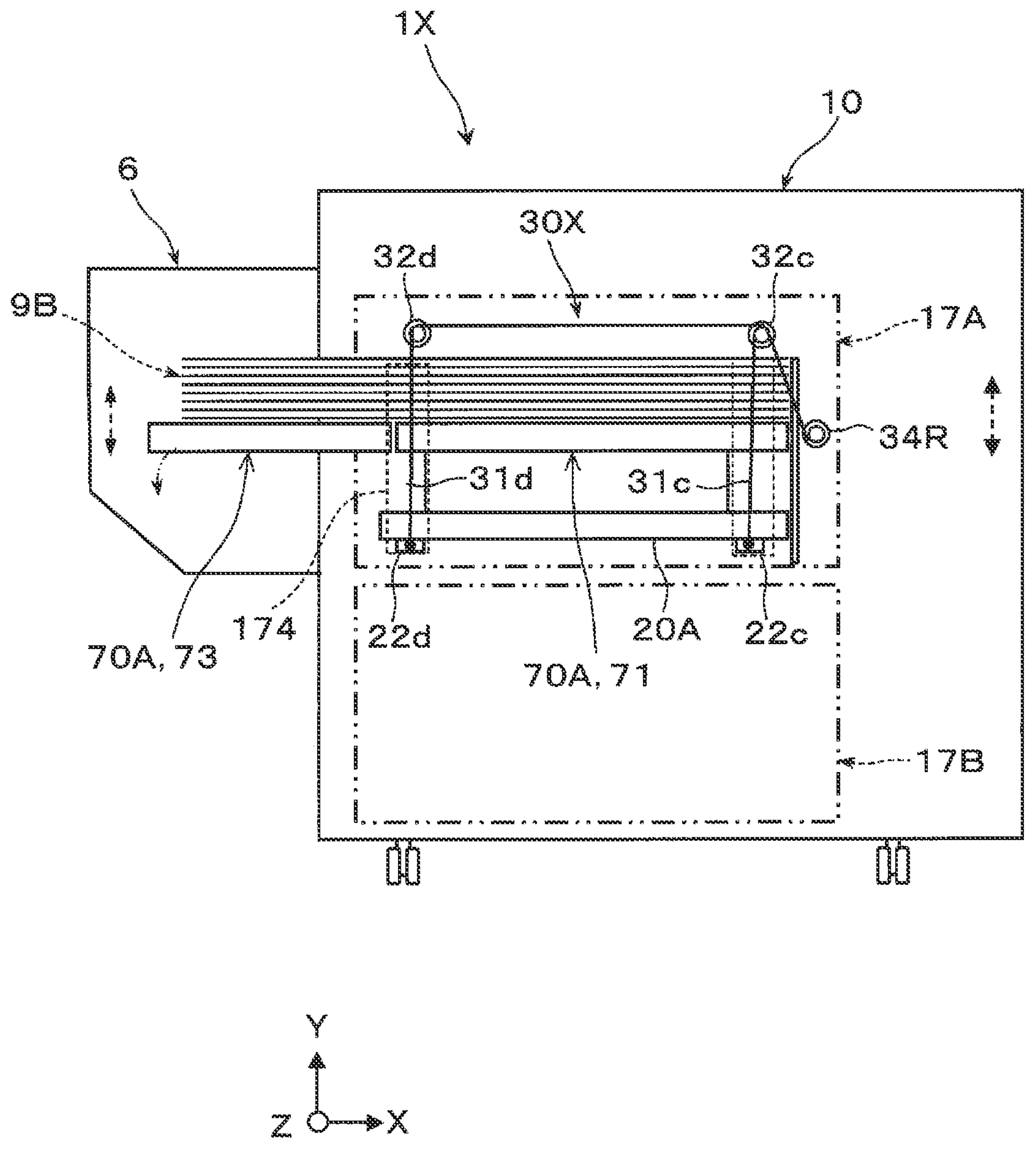
FIG. 21 is a side view roughly illustrating a lift and a long mount portion in a feeder according to a comparative example.

As illustrated in FIG. 21, when a feeder 1X according to a comparative example including a lift 30X having hanging wires 31 attached to only four portions of the dedicated mount portion 71, serving as an unchanged mount portion, is used as the feeder 1 here, the lift 30X hangs the entirety of the long mount portion 70A in a poor balanced manner, because the lift 30X has its wires 31 attached to only the dedicated mount portion 71 regardless of an increase of the mass with the additional mount portion 73 obtained by extending the long mount portion 70A and the portion of the long sheet-shaped media 9B stacked on the additional mount portion 73.

Thus, in the feeder 1X according to the comparative example, the lift 30X is more likely to unstably raise the long mount portion 70A, and, in the worst case, the lift 30X may be partially damaged or broken. Alternatively, the additional mount portion 73 may be deformed to bend downward due to the mass of the portion of the long sheet-shaped media 9B stacked thereon, so that the long sheet-shaped media 9B stacked on the bent additional mount portion 73 may be inclined downward and cause, for example, a transport failure.

As illustrated in FIGS. 7 to 9 and other drawings, in the sheet-shaped-medium feeder 1, the lift 30 thus has the wires 31 attached to the dedicated mount portion 71 of the long mount portion 70A, corresponding to the unchanged mount portion 70*a*, and to the additional mount portion 73, corresponding to the extended mount portion 70*b*.

The lift 30 according to the first exemplary embodiment has the wires 31 attached to, for example, the dedicated mount portion 71 at the above-described four positions, and attached at two positions, that is, one position in the transportation direction D at each of left and right edges of the additional mount portion 73 in the direction crossing the transportation direction D.

As illustrated in FIGS. 3, 9, and 11B and other drawings, in addition to the four positions at which the wires 31 of the lift 30 are attached, the additional mount portion 73 has two hanging portions 68*a* and 68*b* at left and right edges. The hanging portions 68*a* and 68*b* protrude outward.

As illustrated in FIG. 8, the additional mount portion 73 has the hanging portions 68*a* and 68*b* fitted into two guide portions 69 from the inner side of the body 61. The guide portions 69 are disposed on the near and far side walls of the body 61 of the additional device 6. The guide portions 69 are guide grooves or long guide holes linearly extending by a predetermined length in the vertical direction, as the case of the guide holes 174 formed in, for example, the feed unit 12 on the upper side of the housing 10.

Thus, the additional mount portion 73 vertically moves while having the hanging portions 68*a* and 68*b* guided along the guide portions 69 inside the body 61 of the additional device 6.

As illustrated in FIGS. 7 to 9 and other drawings, the lift 30 includes two wires 31*e* and 31*f* and winding pulleys 32*e* and 32*f*. The two wires 31*e* and 31*f* have their trailing ends respectively coupled to the hanging portions 68*a* and 68*b* at two positions of the additional mount portion 73. The winding pulleys 32*e* and 32*f* are rotatably attached to portions of the body 61 above the upper ends of the guide portions 69, and allow the wires 31*e* and 31*f* to be wound therearound.

The hanging portions 68*a* and 68*b* and the winding pulleys 32*e* and 32*f* are disposed in the additional device 6 in advance.

As illustrated in FIGS. 7 and 9 and other drawings, the wire 31*e* disposed on the left is taken up by the left taking-up pulley 34L after being wound around the winding pulley 32*e*, the winding pulley 32*b*, the auxiliary pulley 33*b*, the auxiliary pulley 33*a*, and the winding pulley 32*a* in this order. As illustrated in FIGS. 8 and 9 and other drawings, the wire 31*f* disposed on the right is taken up by the right taking-up pulley 34R after being wound around the winding pulley 32*f*, the winding pulley 32*d*, and the winding pulley 32*c* in this order.

The wires 31*e* and 31*f* are prepared as attachments of the additional device 6.

To attach the additional device 6 including the lift 30 to the side portion 10S of the housing 10, additional portions of the lift 30 are assembled in the following manner.

Specifically, to assemble the additional portions of the lift 30, the wires 31*e* and 31*f* are attached to the hanging portions 68*a* and 68*b* of the additional mount portion 73, and wound around, for example, the winding pulleys 32*e* and 32*f* and the taking-up pulleys 34L and 34R.

Here, in the sheet-shaped-medium feeder 1 to which the additional device 6 is attached, to stack the long sheet-shaped media 9B on the long mount portion 70A, as illustrated in FIG. 4, the open-close member 15 in the upper portion 11 of the housing 10 and the open-close portion 62 in the additional device 6 are opened before the stacking operation.

To perform the operation of stacking the long sheet-shaped media 9B, the rotation shaft 35 and the driving device 37 in the lift 30 are temporarily disconnected, and the long mount portion 70A is lowered by its weight to the lowest position of the mount portion 20A that supports the raised portion 78 of the dedicated mount portion 71.

After the operation of stacking the long sheet-shaped media 9B is finished, the open-close member 15 and the open-close portion 62 are closed (FIG. 3). Here, the rotation shaft 35 and the driving device 37 in the lift 30 are coupled together.

Operation of Feeding Long Sheet-Shaped Medium

The sheet-shaped-medium feeder 1 to which the additional device 6 is retrofitted feeds the long sheet-shaped media 9B in the following manner.

As illustrated in FIG. 12A, in the feeder 1 to which the additional device 6 is attached, the long mount portion 70A receives the long sheet-shaped media 9B, and the long mount portion 70A is raised when performing the feeding operation.

The long mount portion 70A at this time is hung in the container 17A of the housing 10 and the body 61 of the additional device 6 by the lift 30 simultaneously taking up the wires 31*a*, 31*b*, 31*c*, 31*d*, 31*e*, and 31*f*. The long mount portion 70A is raised until the top portion of the long sheet-shaped media 9B stacked on the long mount portion 70A reaches the predetermined height (until detection information is acquired from the position sensor 39).

As illustrated in FIG. 12B, the long mount portion 70A is appropriately raised by an appropriate amount regardless of reduction, resulting from the feeding, of the quantity of the long sheet-shaped media 9B stacked on the long mount portion 70A.

Subsequently, in the long mount portion 70A, air is discharged from the air outlets 50 in the left and right side walls 25L and 25R in the housing 10 and the air outlets 65 in the left side wall 63L in the additional device 6 to cause upper ones of the long sheet-shaped media 9B stacked on the long mount portion 70A to float and separate from each other with the air flow. In the container 17A of the housing 10, the leading end portion, in the transportation direction D, of the floating uppermost one of the sheet-shaped media 9B is sucked by receiving a suction force from the suction portion 41 of the discharger 40A.

Subsequently, in the feeder 1 to which the additional device 6 is attached, the suction portion 41 of the discharger 40A moves to transport the leading end of the sucked one of the long sheet-shaped media 9B on the downstream side in the transportation direction D to the delivery position where the suction portion 41 passes the leading end to the transport portion 45 of the discharger 40A, to pass the leading end to the transport portion 45. In addition, the transport portion 45 discharges the delivered long sheet-shaped medium 9B from the long mount portion 70A and the container 17A with a transport force to feed the long sheet-shaped medium 9B to the first transport path Rh1.

Thus, after the long sheet-shaped medium 9B is discharged from the discharge port 18 via the first transport path Rh1, the long sheet-shaped medium 9B is fed from the feeder 1 to which the additional device 6 is attached to the image forming apparatus 120A (the first introduction transport path Rt1 of the image forming apparatus 120A), serving as an example of a destination.

Here, in the feeder 1 to which the additional device 6 is attached, the long mount portion 70A is raised by the additional mount portion 73 being hung by the lift 30 taking up the wires 31*e* and 31*f*, in addition to the dedicated mount portion 71 being hung by the lift 30 taking up the wires 31*a*, 31*b*, 31*c*, and 31*d*. In other words, the long mount portion 70A is raised in response to the operation of the dedicated mount portion 71 and the additional mount portion 73 being hung with the wires 31 of the lift 30.

Thus, in the feeder 1, also when the mount portion 20A receiving the normal sheet-shaped media 9A is changed to the long mount portion 70A capable of receiving the long sheet-shaped medium 9B, the long mount portion 70A is preferably raised or lowered, particularly, raised while being well balanced as a whole, unlike in the case where the lift 30 has no wire 31 attached to both the dedicated mount portion 71, corresponding to the mount portion 20A of the unchanged mount portion 70A, and the additional mount portion 73, corresponding to the extended portion. The dedicated mount portion 71 corresponds to the unchanged mount portion 20A in the long mount portion 70A.

Thus, in the feeder 1, the lift 30 stably raises the long mount portion 70A, and is less likely to be damaged or broken. The feeder 1 prevents the additional mount portion 73 from being deformed so as to bend downward due to the mass of the portion of the stacked long sheet-shaped media 9B, and thus prevents the long sheet-shaped media 9B stacked on the additional mount portion 73 from inclining downward and causing a transport failure.

An image forming system 100A, serving as an example of the sheet-shaped-medium handling apparatus 100, more stably feeds the long sheet-shaped media 9B to an image forming apparatus 120A, serving as an example of the processing device 120, while having the entirety of the long mount portion 70A in the feeder 1 raised or lowered in a well-balanced manner than the structure where the sheet-shaped-medium feeder 1 does not include a feeder with the above structure.

This feeder 1 has the entirety of the long mount portion 70A more stably raised or lowered in a well-balanced manner than in a structure where the lift 30 does not have wires 31 attached at the four portions of the dedicated mount portion 71, serving as unchanged mount portions in the long mount portion 70A, and at the two portions of the additional mount portion 73, serving as extended portion than before.

The feeder 1 is capable of more stably raising or lowering the entirety of the long mount portion 70A in a well-balanced manner with a simple structure than in a structure where the lift 30 does not include the winder 38 that takes up and unwinds the wires 31*a*, 31*b*, 31*c*, and 31*d*, attached to the dedicated mount portion 71, having a mount area the same as the unchanged mount portion 20A in the long mount portion 70A, and the wires 31*e* and 31*f*, attached to the additional mount portion 73 serving as the extended portion than before.

Second Exemplary Embodiment

Figure 13:
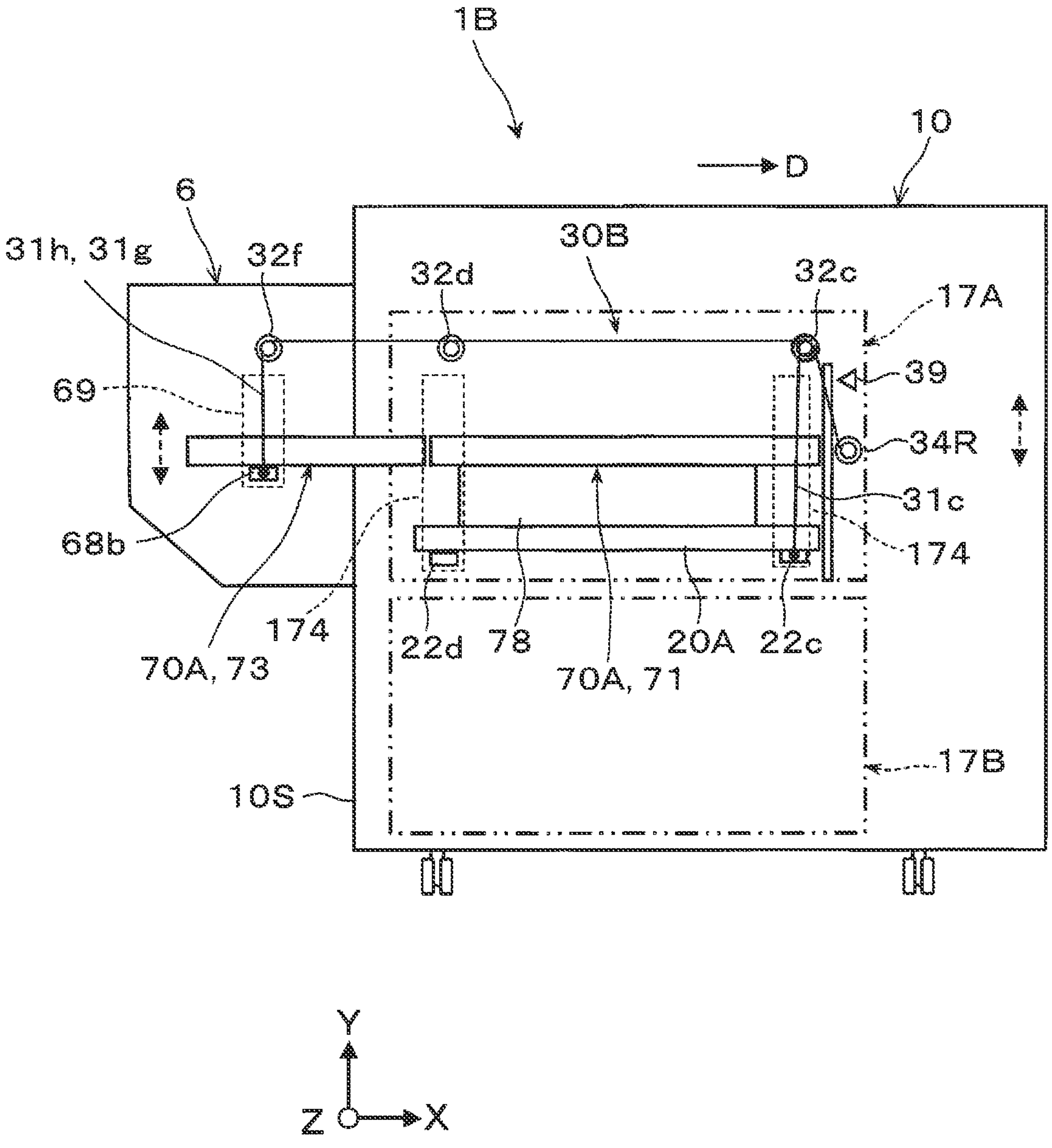
FIG. 13 is a side view roughly illustrating a lift and a long mount portion in a feeder according to a second exemplary embodiment.

FIG. 13 illustrates a sheet-shaped-medium feeder 1B according to a second exemplary embodiment.

The sheet-shaped-medium feeder 1B has the same structure as the feeder 1 according to the first exemplary embodiment except that the lift 30 is replaced with a lift 30B having wires 31 attached at two positions of the dedicated mount portion 71, corresponding to the unchanged mount portion 20A in the long mount portion 70A, and at two positions of the additional mount portion 73, corresponding to the extended portion in the long mount portion 70A.

Figure 14:
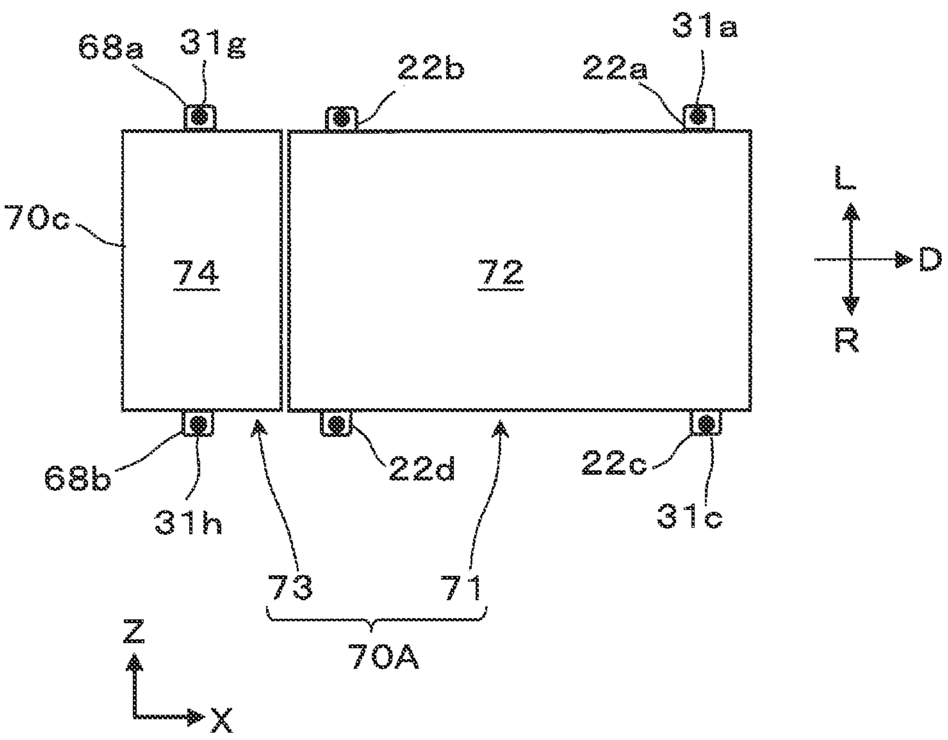
FIG. 14 is a schematic plan view of a long mount portion of the feeder illustrated in FIG. 3.

As illustrated in FIGS. 13 and 14, the lift 30B according to the second exemplary embodiment has the wires 31*a* and 31*c* attached at two positions, that is, one position in the transportation direction D at each of left and right edges of the dedicated mount portion 71 in the direction crossing the transportation direction D, and wires 31*g* and 31*h* attached at two positions, that is, one position in the transportation direction D at each of left and right edges of the additional mount portion 73 in the direction crossing the transportation direction D.

The hanging portions 22*a* and 22*c* disposed at the dedicated mount portion 71 are used as examples of the two positions of the dedicated mount portion 71. The hanging portions 68*a* and 68*b* disposed at the additional mount portion 73 are used as examples of the two positions of the additional mount portion 73.

As in the case of the hanging portions 22*a* and 22*c* in the unchanged mount portion 20A, the wires 31*a* and 31*c* are attached to the hanging portions 22*a* and 22*c* of the dedicated mount portion 71 as they are. As illustrated in FIG. 14, after the wires 31*b* and 31*d* attached to the hanging portions 22*b* and 22*d* at the unchanged mount portion 20A are removed, new wires 31*g* and 31*h* are wound around the hanging portions 68*a* and 68*b* of the additional mount portion 73, after being wound around, for example, the winding pulleys 32*e* and 32*f* (FIG. 9).

Examples used as the wires 31*g* and 31*h* may be long wires 31*b* and 31*d* that have been attached to the hanging portions 22*b* and 22*d* at the unchanged mount portion 20A, and that are extended to the hanging portions 68*a* and 68*b* of the additional mount portion 73 after being removed from the hanging portions 22*b* and 22*d* at the mount portion 20A.

The sheet-shaped-medium feeder 1B including the lift 30B with fewer wires 31 is capable of raising or lowering the long mount portion 70A including the dedicated mount portion 71 and the additional mount portion 73 in a well-balanced manner with a simpler structure than in a structure where the lift 30B does not have wires 31 attached to two positions of the dedicated mount portion 71, corresponding to an unchanged mount portion in the long mount portion 70A, and two positions of the additional mount portion 73, corresponding to an extended portion than before.

Figure 15A:
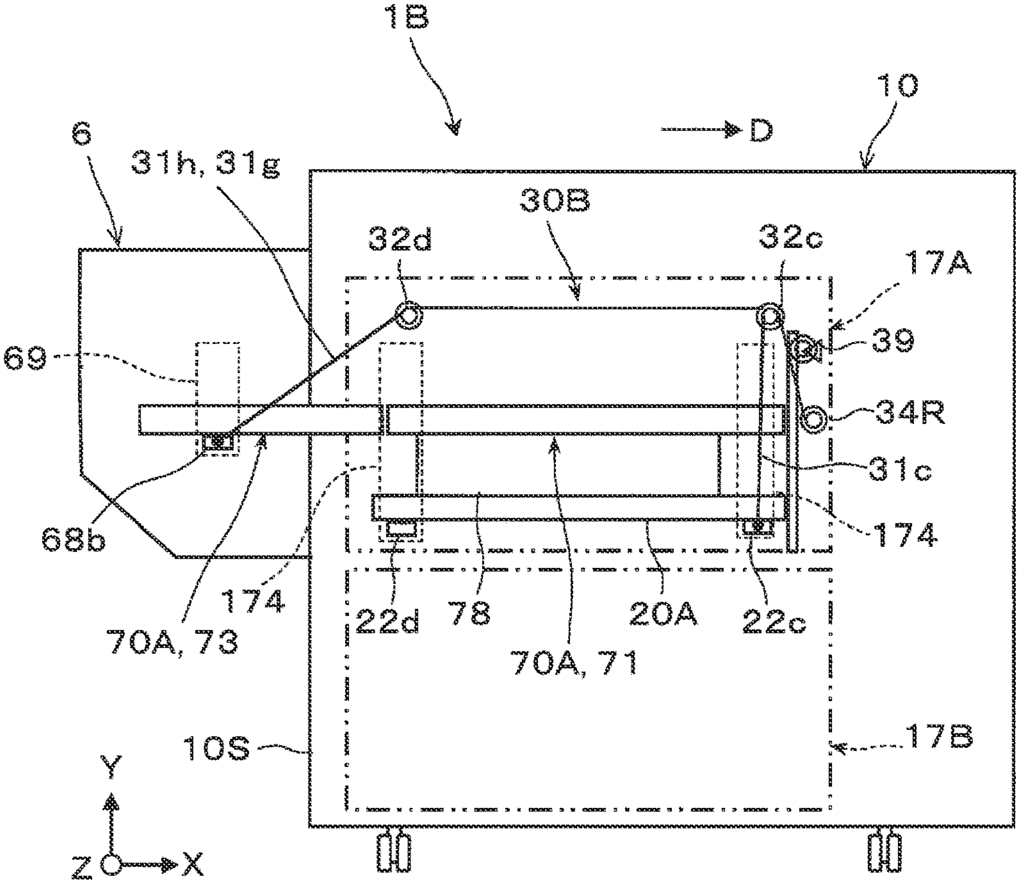
FIG. 15A is a side view roughly illustrating a lift and a long mount portion in a feeder according to a modification example of the second exemplary embodiment.
Figure 15B:
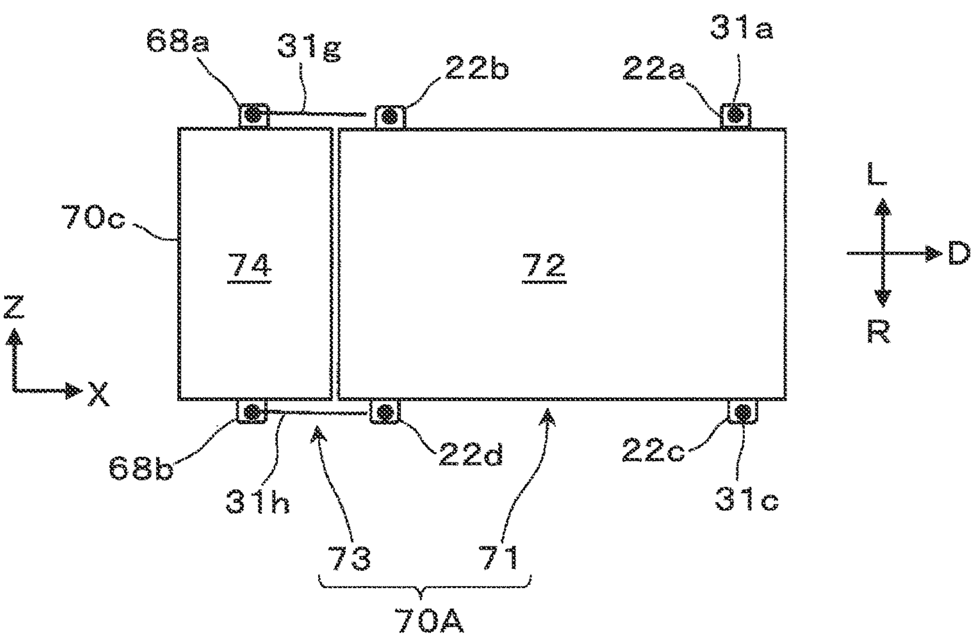
FIG. 15B is a schematic plan view illustrating the long mount portion in the feeder illustrated in FIG. 15A.

As illustrated in FIGS. 15A and 15B, in the feeder 1B, the wires 31*g* and 31*h* attached to the hanging portions 68*a* and 68*b* of the additional mount portion 73 may be attached to the hanging portions 68*a* and 68*b* after being wound around the winding pulleys 32*b* and 32*d* in the feed unit 12 on the upper side without being wound around the winding pulleys 32*e* and 32*f* (FIG. 9) in the additional device 6.

Here, the additional device 6 may omit the winding pulleys 32*e* and 32*f*. Also in this case, the additional device 6 preferably includes guide portions 69 for securing stable vertical movement of the additional mount portion 73.

Third Exemplary Embodiment

Figure 16A:
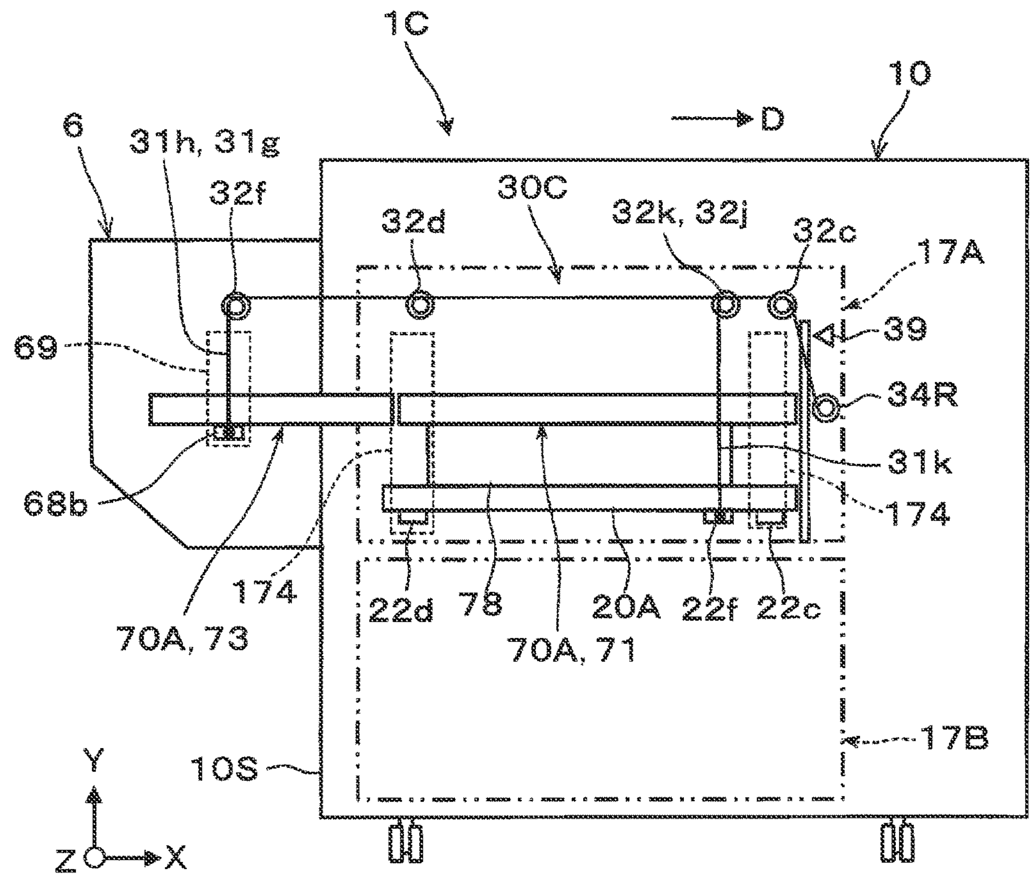
FIG. 16A is a side view roughly illustrating a lift and a long mount portion in a feeder according to a third exemplary embodiment.
Figure 16B:
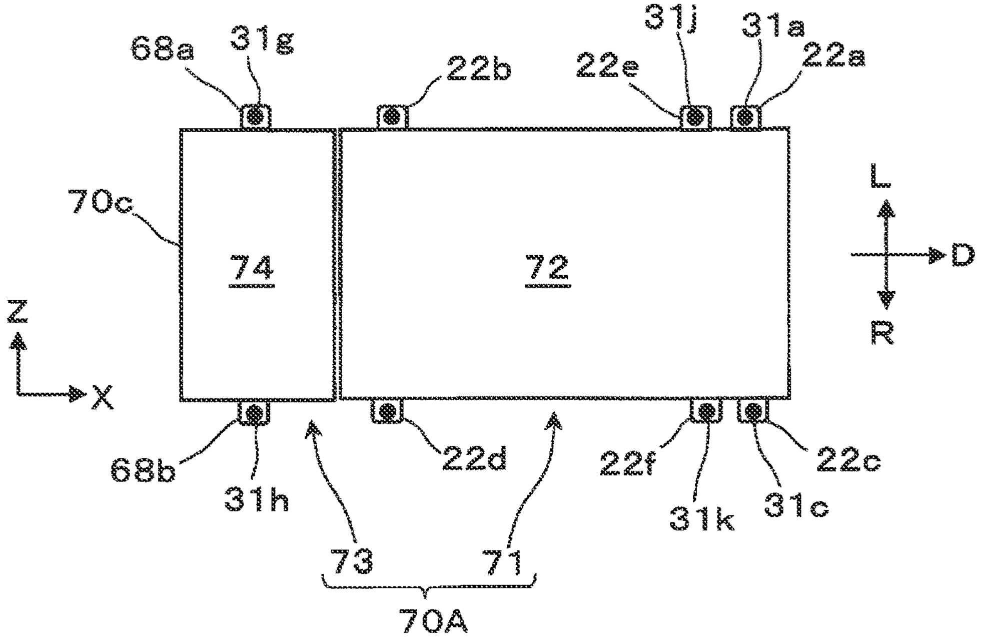
FIG. 16B is a schematic plan view illustrating the long mount portion in the feeder illustrated in FIG. 16A.

FIGS. 16A and 16B illustrate a sheet-shaped-medium feeder 1C according to a third exemplary embodiment.

The sheet-shaped-medium feeder 1C has the same structure as the feeder 1B according to the second exemplary embodiment except that the lift 30B is replaced with a lift 30C, which is different in terms of the two positions of the dedicated mount portion 71 in the long mount portion 70A to which the wires 31 are attached.

As illustrated in FIGS. 16A and 16B, as in the case of the lift 30B according to the second exemplary embodiment, the lift 30C according to the third exemplary embodiment has the wires 31*g* and 31*h* attached at the hanging portions 68*a* and 68*b*, or the same two positions of the additional mount portion 73, and wires 31*j* and 31*k* attached at hanging portions 22*e* and 22*f*, newly disposed instead of the hanging portions 22*a* and 22*c* or the two positions of the dedicated mount portion 71.

The new hanging portions 22*e* and 22*f* are located at well-balanced positions in the length direction of the long mount portion 70A in the transportation direction D, or in the third exemplary embodiment, to have substantially the same positional relationship with the hanging portions 68*a* and 68*b* of the additional mount portion 73 located inward from the end portion 70*c*.

Specifically, the new hanging portions 22*e* and 22*f* are located inward from a downstream end 70*b* of the long mount portion 70A in the transportation direction D by the distance the same as the distance by which the hanging portions 68*a* and 68*b* of the additional mount portion 73 are located inward from the upstream end 70*c* of the long mount portion 70A in the transportation direction D.

These new hanging portions 22*e* and 22*f* are disposed in advance on the dedicated mount portion 71, but may alternatively be added to the long mount portion 70A.

In addition to the new hanging portions 22*e* and 22*f*, the lift 30C includes new winding pulleys 32*j* and 32*k*, around which wires 31*j* and 31*k* attached to the hanging portions 22*e* and 22*f* are wound, at the container 17A. The new winding pulleys 32*j* and 32*k* are disposed at substantially vertically above the hanging portions 22*e* and 22*f*.

As the wires 31*j* and 31*k* of the lift 30C, the wires 31*a* and 31*c* attached to the original hanging portions 22*a* and 22*c* of the dedicated mount portion 71 may be used as they are, or new wires are used.

When changing the unchanged mount portion 20A to the long mount portion 70A, the wires 31*a* and 31*c* in the lift 30C attached to the hanging portions 22*a* and 22*c* of the dedicated mount portion 71 are removed, and then attached to the new hanging portions 22*e* and 22*f* for shifting.

In this lift 30C, as in the case of the lift 30B, the wires 31*b* and 31*d* attached to the hanging portions 22*b* and 22*d* of the dedicated mount portion 71 are removed, and then the new wires 31*g* and 31*h* are attached to the hanging portions 68*a* and 68*b* in the additional mount portion 73.

In the sheet-shaped-medium feeder 1C, the four wires 31*j*, 31*k*, 31*g*, and 31*h* in the lift 30C are attached to the hanging portions 22*e*, 22*f*, 68*a*, and 68*b* located at dimensionally well-balanced positions in the length direction of the long mount portion 70A compared to the case of the lift 30B. Thus, the feeder 1C is capable of more stably raising and lowering the entirety of the long mount portion 70A in a well-balanced manner.

Fourth Exemplary Embodiment

Figure 17:
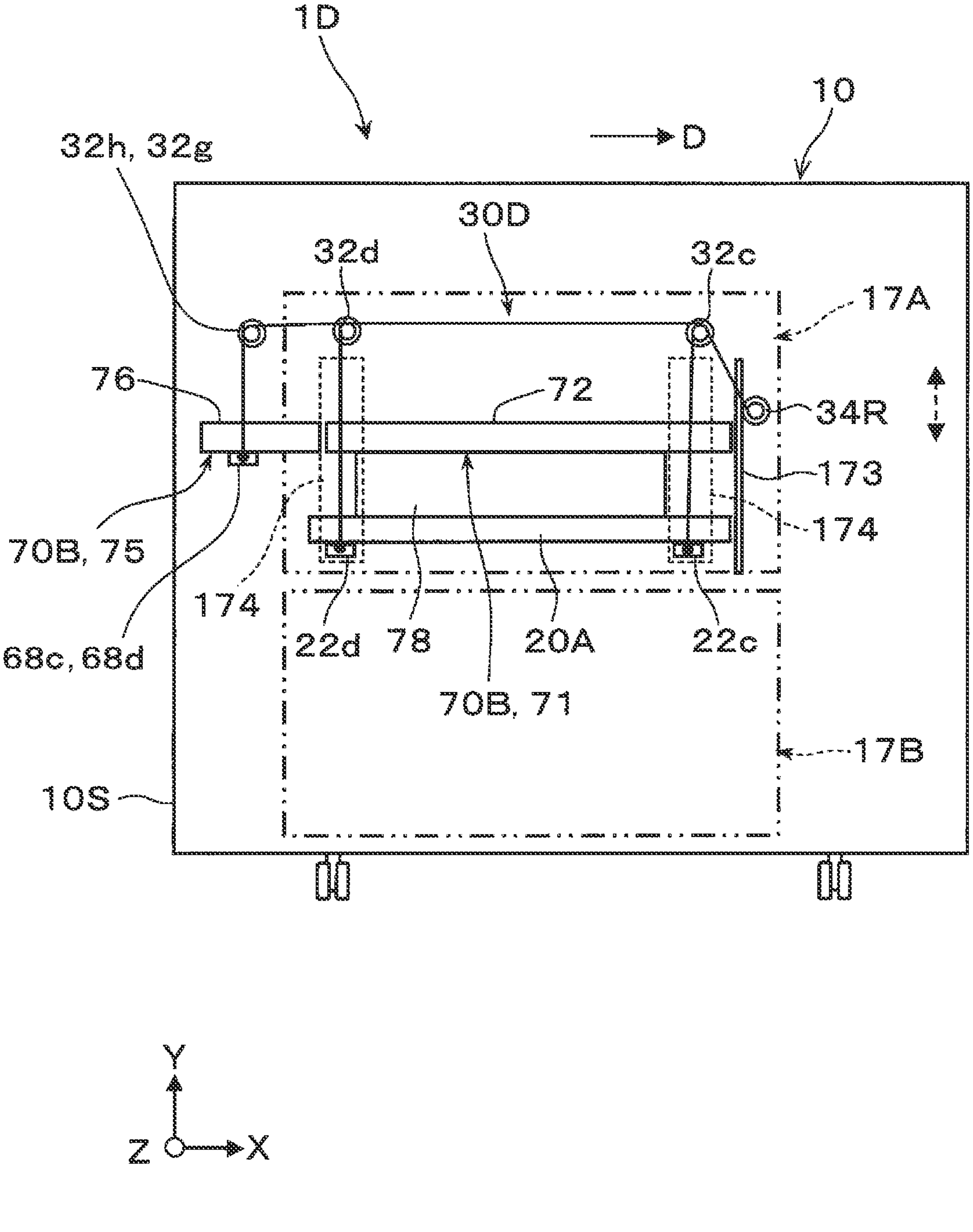
FIG. 17 is a side view roughly illustrating a lift and a long mount portion in a feeder according to a fourth exemplary embodiment.

FIG. 17 illustrates a sheet-shaped-medium feeder 1D according to a fourth exemplary embodiment.

The sheet-shaped-medium feeder 1D is substantially similar to the feeder 1 according to the first exemplary embodiment except that it includes a long mount portion 70B used as the long mount portion 70 without the additional device 6 being attached thereto. The long mount portion 70B is accommodated in the housing 10, including the extended mount portion 70*b*.

Figure 18A:
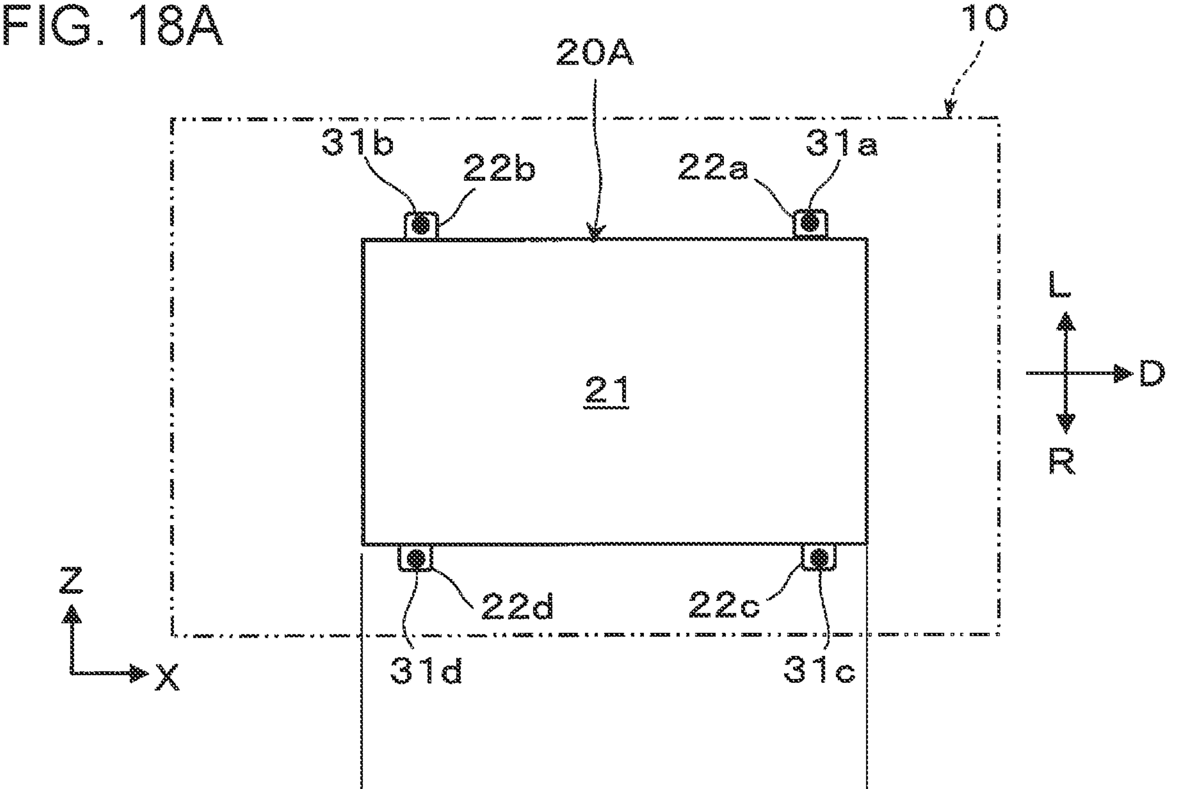
FIG. 18A is a schematic plan view of an unchanged mount portion illustrated in FIG. 17.
Figure 18B:
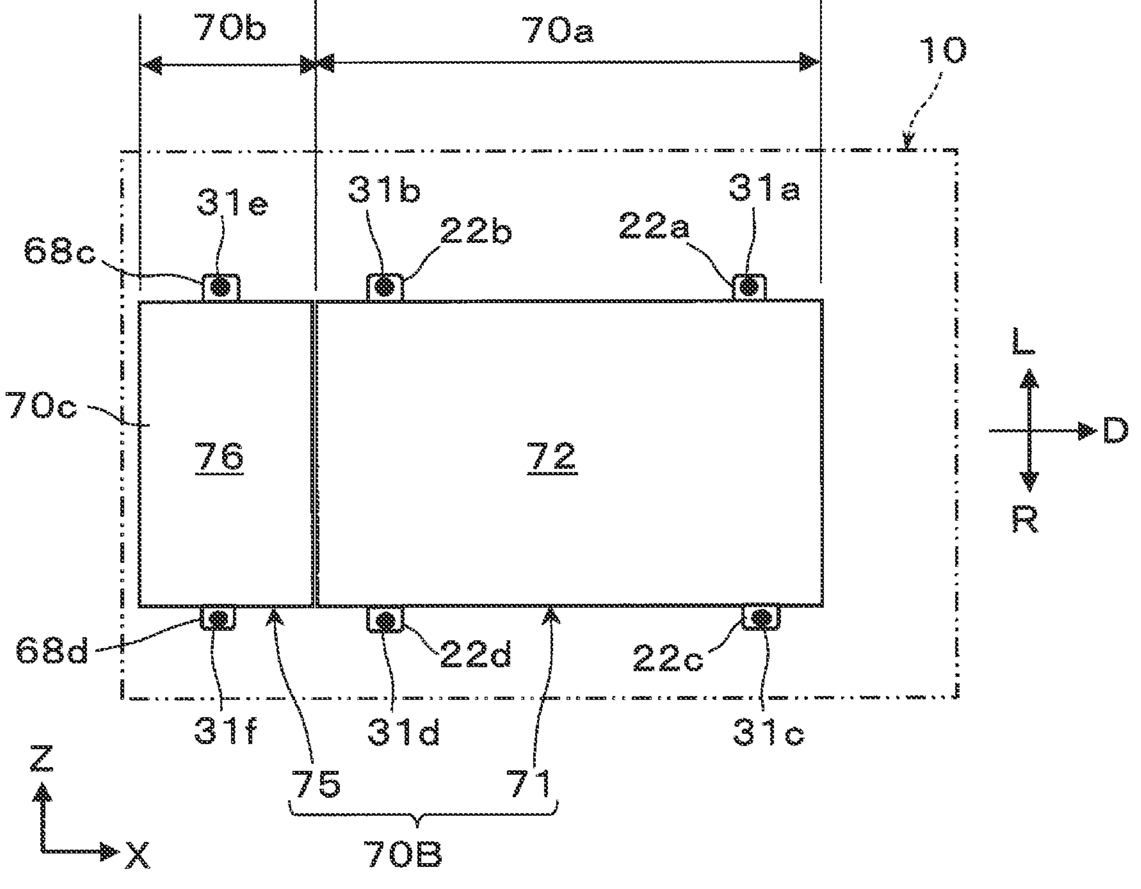
FIG. 18B is a schematic plan view of a long mount portion obtained after change from the mount portion illustrated in FIG. 17.

As illustrated in FIGS. 17, 18A, and 18B, the long mount portion 70B in the feeder 1D includes the dedicated mount portion 71 disposed in the housing 10, and the additional mount portion 75, additionally disposed at the upstream end portion of the dedicated mount portion 71 in the transportation direction D. Here, the dedicated mount portion 71 corresponds to the unchanged mount portion 70*a*, and an additional mount portion 75 corresponds to the extended mount portion 70*b*.

The dedicated mount portion 71 has the same structure as the dedicated mount portion 71 according to the first exemplary embodiment. Specifically, the dedicated mount portion 71 is disposed above the raised portion 78 placed on the mount portion 20A in the container 17A in the feed unit 12 on the upper side.

The dedicated mount portion 71 includes a mount surface 72 having the same structure as that of the dedicated mount portion 71 according to the first exemplary embodiment.

The additional mount portion 75 is disposed in a gap space left between the upstream end of the dedicated mount portion 71 and the side portion 10S of the housing 10, and includes a mount surface 76 that receives the upstream end portions of the long sheet-shaped media 9B in the transportation direction D. The additional mount portion 75 is coupled to and integrated with the upstream end portion of the dedicated mount portion 71 with a fastening device not illustrated.

The additional mount portion 75 includes hanging portions 68*c* and 68*d* respectively disposed at the left and right edges.

As illustrated in FIGS. 17 and 18B, the lift 30D in the feeder 1D has wires 31 attached to both the dedicated mount portion 71, corresponding to the unchanged mount portion 70*a* in the long mount portion 70B, and the additional mount portion 75, corresponding to the extended mount portion 70*b*.

Specifically, the lift 30D has the wires 31*a*, 31*b*, 31*c*, and 31*d* respectively attached to the hanging portions 22*a*, 22*b*, 22*c*, and 22*d* at four positions in the dedicated mount portion 71, and has the wires 31*e* and 31*f* respectively attached to the hanging portions 68*c* and 68*d* at two positions or left and right ends of the additional mount portion 75.

In the fourth exemplary embodiment, the additional mount portion 75 has neither the left and right side walls 63L and 63R, the air outlets 65, the height limiters 67, nor the guide portions 69 according to the first exemplary embodiment that guide the hanging portions 68*c* and 68*d* moving vertically.

Thus, the feeder it has a structure simplified with the elimination of these components and the additional device 6, and saves space for installation.

Nevertheless, the feeder 1D may include any of these as needed. When the feeder 1D includes the left and right side walls 63L and 63R, for example, the mount surface 76 or the additional mount portion 75 has the same surface structure as in the case of the mount surface 74 of the additional mount portion 73 according to the first exemplary embodiment.

The feeder it including the long mount portion 70B is capable of receiving, on the long mount portion 70B, the long sheet-shaped media 9B with a length receivable in the housing 10. The long sheet-shaped media 9B are stacked on the long mount portion 70B in the feeder 1D while the open-close member 15 in the upper portion 11 of the housing 10 is opened (refer to FIG. 4).

Also when the mount portion 20A of the normal sheet-shaped media 9A is changed to the long mount portion 70B capable of receiving the long sheet-shaped media 9B, the feeder 1D is capable of more stably raising and lowering the entirety of the long mount portion 70B in a well-balanced manner than in the case where the lift 30D has no wires 31 attached to the additional mount portion 75 in the long mount portion 70B.

MODIFICATION EXAMPLE

Figure 19A:
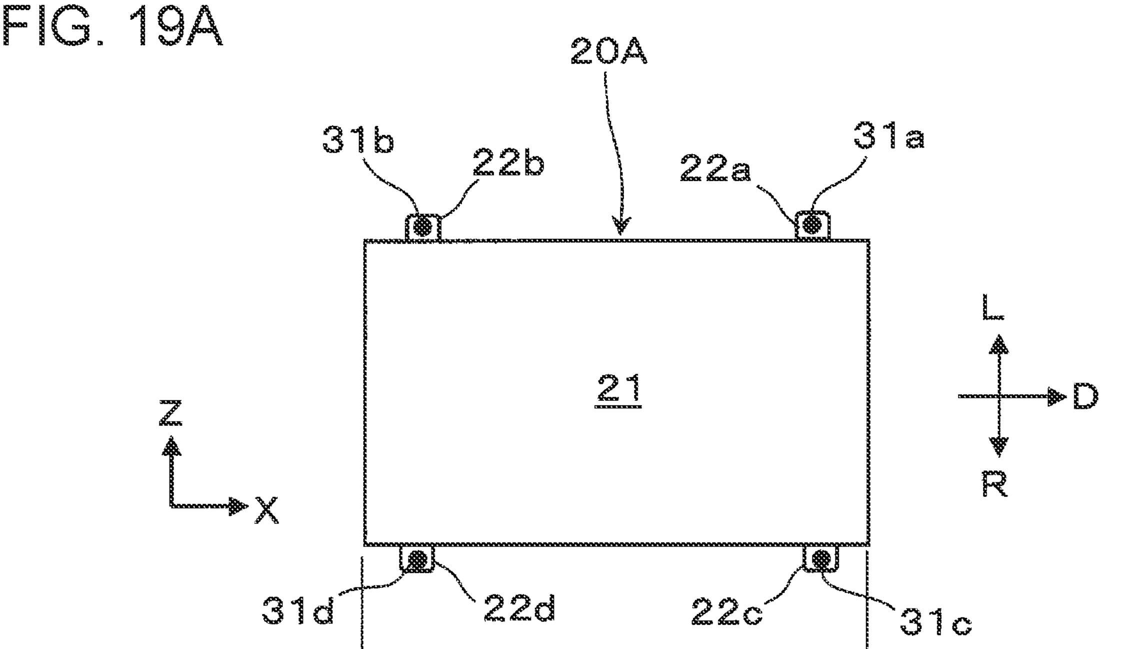
FIG. 19A is a schematic plan view of an unchanged mount portion according to a modification example.
Figure 19B:
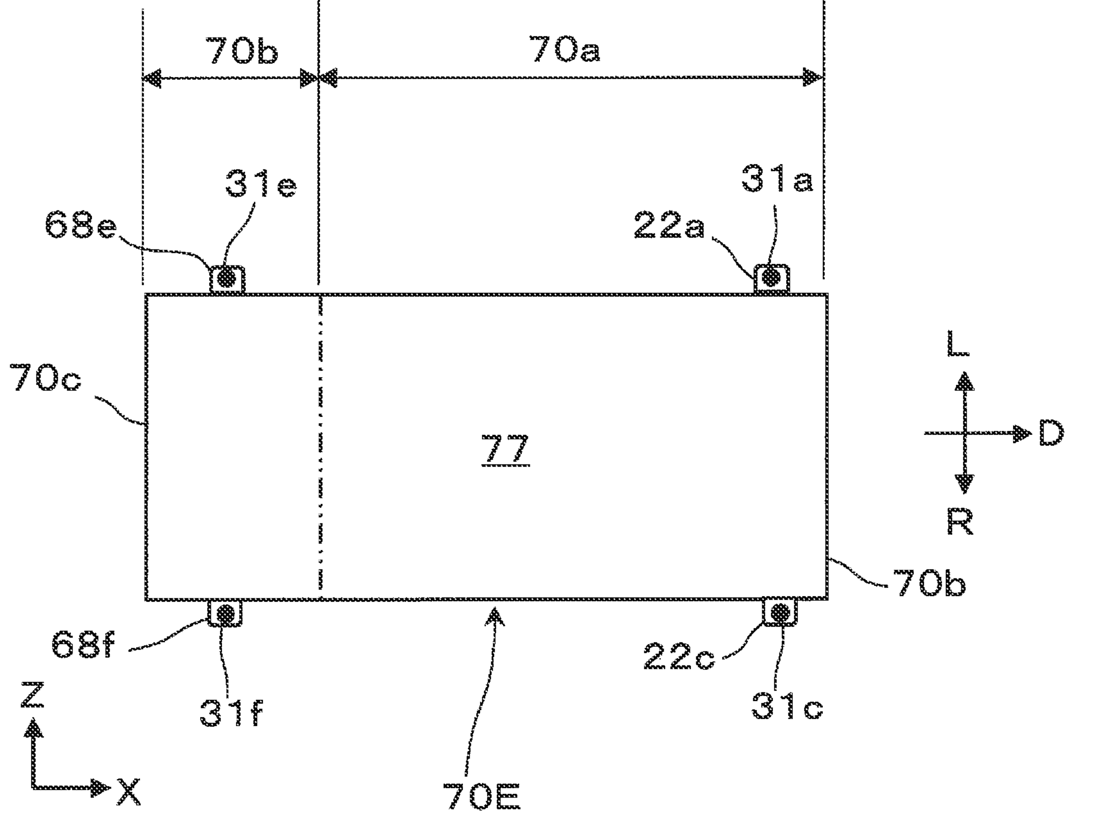
FIG. 19B is a schematic plan view of a long mount portion according to a modification example.

Each of the feeders 1, 1B, 1C, and 1D according to the first to fourth exemplary embodiments may include, instead of the long mount portion 70A or 70B, a replacement mount portion 70E exemplarily illustrated in FIGS. 19A and 19B.

The replacement mount portion 70E serves as a long mount portion attached in place of the dedicated mount portion (mount portion 20A) disposed in the housing 10. As illustrated in FIG. 19B, the replacement mount portion 70E also includes the mount portion 70*a*, corresponding to the unchanged mount portion 20A, and the mount portion 70*b* extended from the unchanged portion. The mount portion 70*a*, corresponding to the unchanged mount portion 20A, of the dedicated mount portion 71 includes the raised portion 78, but may not include the raised portion 78.

The replacement mount portion 70E includes a continuous mount surface 77. In the strictest sense, the mount surface 77 has a surface structure including the slide surfaces 72B and 74B to install the left and right side walls 25L, 25R, 63L, and 63R.

In a structure including the replacement mount portion 70E, the lift 30 may include wires 31 attached at the above four positions of the unchanged mount portion 70*a* and the above two positions of the mount portion 70*b* extended from the unchanged portion, or attached at the above two positions of the unchanged mount portion 70*a* and the above two positions of the mount portion 70*b* extended from the unchanged portion.

In the structure including the replacement mount portion 70E illustrated in FIG. 19B, the lift 30 has the wires 31*a* and 31*c* attached to the hanging portions 22*a* and 22*c* disposed at two positions of the mount portion 70*a* corresponding to the unchanged mount portion 20A, and the wires 31*e* and 31*f* attached to hanging portions 68*e* and 68*f* disposed at two positions of the mount portion 70*b* extended from the unchanged portion.

Also when the mount portion 20A of the normal sheet-shaped media 9A is changed to the replacement mount portion 70E that is capable of receiving the long sheet-shaped media 9B, for example, the feeder 1 including the replacement mount portion 70E is capable of raising or lowering the entirety of the long mount portion 70 formed from the replacement mount portion 70E in a well-balanced manner with a simpler structure than in the case of the structure where the wires are not attached to the two positions of the extended mount portion 70*b* in the replacement mount portion 70E.

For example, the lift 30 may include other line members such as belts instead of the wires 31. When no container 17 is included, the lift 30 may be disposed at any appropriate portion of the housing 10.

The first to fourth exemplary embodiments have described a structure example of the long mount portion 70 including, as the unchanged mount portion 70*a*, the dedicated mount portion 71 disposed on the mount portion 20A receiving the normal sheet-shaped media 9A with the raised portion 78 interposed therebetween. However, for example, the mount portion 20A may be used without being changed, as the dedicated mount portion 71 without including the raised portion 78 for the unchanged mount portion 70*a*.

For example, the above structure is effective for a feeder capable of receiving a small amount of the long sheet-shaped media 9B, as the weight and load from the long sheet-shaped media 9B does not increase much.

Figure 20:
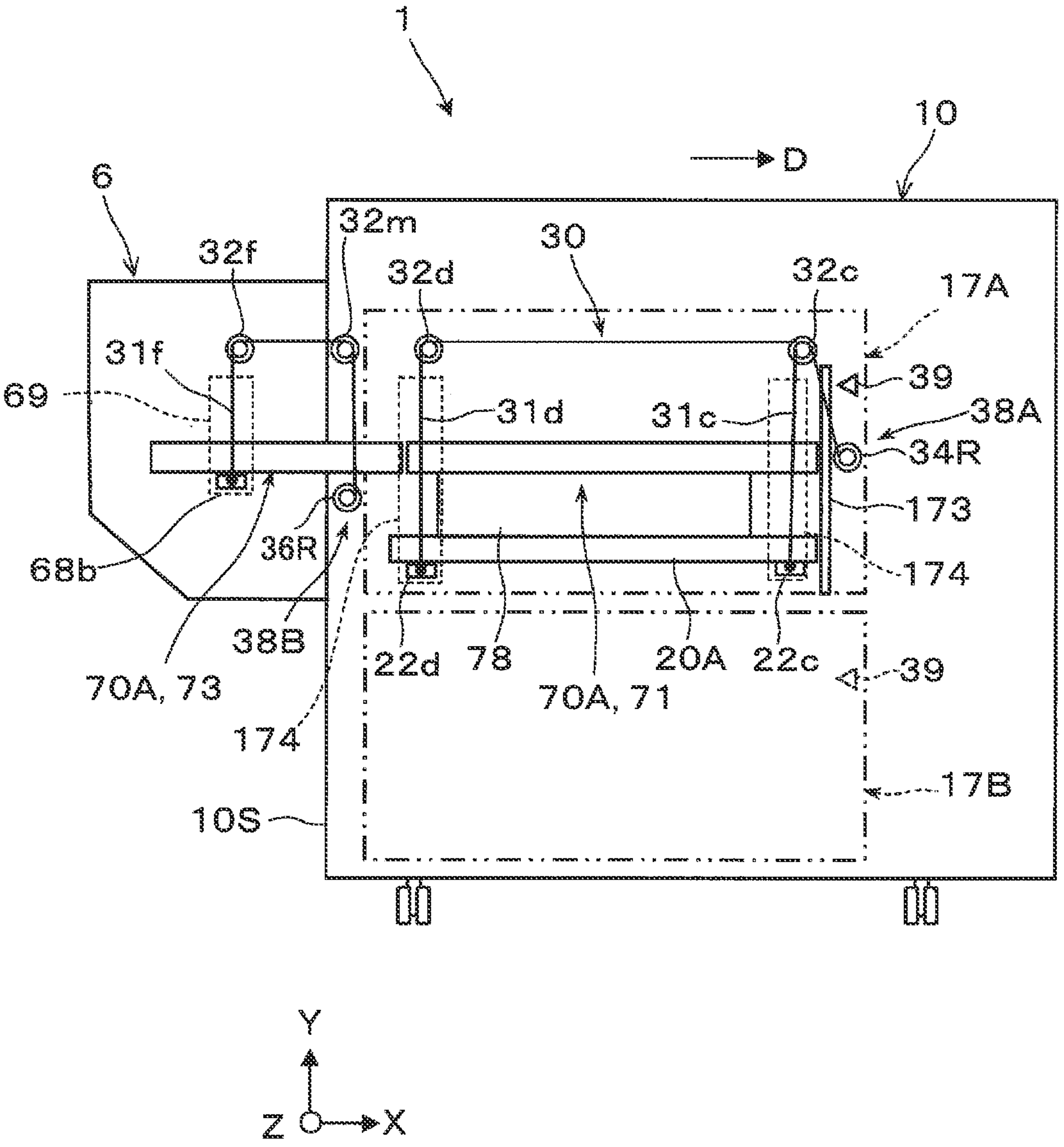
FIG. 20 is a side view roughly illustrating a lift and a long mount portion in a feeder according to a modification example.

In the first to fourth exemplary embodiments, as exemplarily illustrated in FIG. 20, the winder 38 (a device including the taking-up pulleys 34L and 34R, the rotation shaft 35, and the driving device 37) for the wires 31 in the lift 30, 30B, 30C, or 30D may include a first winder 38A and a second winder 38B. The feeder 1 according to the first exemplary embodiment is taken as an example of the feeder illustrated in FIG. 20.

The first winder 38A is a winder that takes up and unwinds the wires 31*a*, 32*b*, 32*c*, and 31*d* attached to the dedicated mount portion 71 and the mount portion 70*a* corresponding to the unchanged mount portion of the long mount portion 70A or 70B. The second winder 38B is a winder that takes up and unwinds the wires 31*e* and 32*f*, 32*g*, and 31*h* attached to the additional mount portion 73 or 75 and the extended mount portion 70*b* in the long mount portion 70 or 70B.

The second winder 38B exemplarily illustrated in FIG. 20 has components such as a taking-up pulley 36R, a winding pulley 32*m*, and a driving device not illustrated located inside the housing 10, but may have these components located in the body 61 of the additional device 6.

The first winder 38A and the second winder 38B are controlled to operate synchronously to cause the dedicated mount portion 71 and the additional mount portion 73 forming the long mount portion 70 to integrally move in the vertical direction.

For example, the feeder 1 including the lift 30 including the first winder 38A and the second winder 38B is capable of more stably raising and lowering the entirety of the long mount portion 70 in a well-balanced manner than in the structure where, for example, the lift 30 has a structure different from the structure including the first winder 38A and the second winder 38B.

The first or another exemplary embodiment has described, as an example of the sheet-shaped-medium handling apparatus 100, the image forming system 100A including the image forming apparatus 120A serving as the processing device 120, but this is not the only possible structure. The handling apparatus 100 may be any apparatus that includes the processing device 120 that performs predetermined processing on the normal sheet-shaped media 9A or the long sheet-shaped media 9B fed from the feeder 1.

Examples of the handling apparatus 100 include printing system including the processing device 120 used as a printer that attaches ink to the normal sheet-shaped media 9A and other media, a painting system including the processing device 120 used as a painting device that applies a liquid paint to the normal sheet-shaped media 9A and other media, and a drying system including the processing device 120 used as a dryer that dries the normal sheet-shaped media 9A and other media.

To install a sheet-shaped-medium feeder inside the processing device 120, the feeder may be the feeder 1, in which the long mount portion 70 is disposed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet-shaped-medium feeder, comprising:

a housing;

a first mount portion that is disposed to be vertically movable in the housing and configured to receive sheet-shaped media;

a second mount portion that is disposed to be vertically movable in the housing, disposed under the first mount portion in a vertical direction, and configured to receive another sheet-shaped media;

a lift that includes line members to vertically raise or lower the first mount portion and the second mount portion by hanging the first mount portion and the second mount portion with the line members;

a first discharger that is configured to transport the sheet-shaped media stacked on the first mount portion; and a second discharger that is configured to transport the another sheet-shaped media stacked on the second mount portion, wherein the first mount portion is changeable to a long mount portion capable of receiving long sheet-shaped media by horizontally extending an upstream end portion of the first mount portion toward an upstream side in a transportation direction of the sheet-shaped media, wherein the lift has the line members attached at a portion of the long mount portion corresponding to an unchanged portion of the first mount portion that is disposed inside the housing, and at a portion of the long mount portion corresponding to an extended portion of the first mount portion that has a downstream end coupled to an upstream end of the unchanged portion in the transportation direction and an upstream end protruding outward from a side portion of the housing into an additional device attached to the side portion of the housing in the transportation direction, wherein a raised portion for raising a mount surface of the mount portion is disposed under the unchanged portion of the mount portion, and the raised portion includes a downstream end wall extending in a depth direction of the sheet-shaped-medium feeder on a downstream side of the transportation direction, an upstream end wall extending in the depth direction of the sheet-shaped-medium feeder on the upstream side of the transportation direction and located under the upstream end of the unchanged portion, and an intermediate portion extending in the transportation direction between the downstream end wall and the upstream end wall, and wherein the lift includes a winder that is configured to take up and unwind a line member attached to the unchanged portion of the first mount portion, and a line member attached to the extended portion of the first mount portion.

2. The sheet-shaped-medium feeder according to claim 1, wherein the long mount portion including the extended portion is accommodated in the housing.

3. The sheet-shaped-medium feeder according to claim 2, wherein the lift has the line members attached at four positions including two positions in the transportation direction at each of left and right edges of the unchanged portion of the first mount portion in a direction crossing the transportation direction and, and at two positions including one position in the transportation direction at each of left and right edges of the extended portion of the first mount portion in the direction crossing the transportation direction.

4. The sheet-shaped-medium feeder according to claim 3, wherein the long mount portion includes a dedicated mount portion disposed inside the housing, and an additional mount portion additionally disposed at an upstream end of the dedicated mount portion in the transportation direction, and wherein the lift has the line members attached at portions in the dedicated mount portion corresponding to the four positions and at portions in the additional mount portion corresponding to the two positions.

5. The sheet-shaped-medium feeder according to claim 2, wherein the lift has the line members attached at two positions including one position in the transportation direction at each of left and right edges of the unchanged portion of the first mount portion in a direction crossing the transportation direction, and at two positions including one position in the transportation direction at each of left and right edges of the extended portion of the first mount portion in the direction crossing the transportation direction.

6. The sheet-shaped-medium feeder according to claim 5, wherein the long mount portion includes a dedicated mount portion disposed inside the housing, and an additional mount portion additionally disposed at an upstream end of the dedicated mount portion in the transportation direction, and wherein the lift has the line members attached at two positions including one position in the transportation direction at each of left and right edges of the dedicated mount portion in a direction crossing the transportation direction, and at two positions including one position in the transportation direction at each of left and right edges of the additional mount portion in the direction crossing the transportation direction.

7. The sheet-shaped-medium feeder according to claim 5, wherein the long mount portion is formed from a replacement mount portion that is to be replaced with a dedicated mount portion disposed inside the housing, and wherein the lift has the line members attached at portions corresponding to the two positions in the dedicated mount portion in the replacement mount portion and at portions corresponding to the two positions in the portion in the replacement mount portion extended from the dedicated mount portion.

8. The sheet-shaped-medium feeder according to claim 1, wherein the lift has the line members attached at four positions including two positions in the transportation direction at each of left and right edges of the unchanged portion of the first mount portion in a direction crossing the transportation direction and, and at two positions including one position in the transportation direction at each of left and right edges of the extended portion of the first mount portion in the direction crossing the transportation direction.

9. The sheet-shaped-medium feeder according to claim 8, wherein the long mount portion includes a dedicated mount portion disposed inside the housing, and an additional mount portion additionally disposed at an upstream end of the dedicated mount portion in the transportation direction, and wherein the lift has the line members attached at portions in the dedicated mount portion corresponding to the four positions and at portions in the additional mount portion corresponding to the two positions.

10. The sheet-shaped-medium feeder according to claim 1, wherein the lift has the line members attached at two positions including one position in the transportation direction at each of left and right edges of the unchanged portion of the first mount portion in a direction crossing the transportation direction, and at two positions including one position in the transportation direction at each of left and right edges of the extended portion of the first mount portion in the direction crossing the transportation direction.

11. The sheet-shaped-medium feeder according to claim 10, wherein the long mount portion includes a dedicated mount portion disposed inside the housing, and an additional mount portion additionally disposed at an upstream end of the dedicated mount portion in the transportation direction, and wherein the lift has the line members attached at two positions including one position in the transportation direction at each of left and right edges of the dedicated mount portion in a direction crossing the transportation direction, and at two positions including one position in the transportation direction at each of left and right edges of the additional mount portion in the direction crossing the transportation direction.

12. The sheet-shaped-medium feeder according to claim 10, wherein the long mount portion is formed from a replacement mount portion that is to be replaced with a dedicated mount portion disposed inside the housing, and wherein the lift has the line members attached at portions corresponding to the two positions in the dedicated mount portion in the replacement mount portion and at portions corresponding to the two positions in the portion in the replacement mount portion extended from the dedicated mount portion.

13. The sheet-shaped-medium feeder according to claim 1, wherein the winder comprises a first winder that is configured to take up and unwind the line member attached to the unchanged portion of the first mount portion, and a second winder that is configured to take up and unwind the line member attached to the extended portion of the first mount portion.

14. A sheet-shaped-medium handling apparatus, comprising:

a sheet-shaped-medium feeder that is capable of transport and feed sheet-shaped media and another sheet-shaped media respectively stacked thereon; and a processing device that is configured to perform processing on the sheet-shaped media and the another sheet-shaped media fed from the feeder, wherein the sheet-shaped-medium feeder includes the sheet-shaped-medium feeder according to claim 1.

* * * * *